US012704275B2

(12) United States Patent
Kim et al.

(10) Patent No.: US 12,704,275 B2
(45) Date of Patent: Aug. 11, 2026

(54) HUMIDIFIER

(71) Applicant: LG ELECTRONICS INC., Seoul (KR)

(72) Inventors: Yongmin Kim, Seoul (KR); Jeongtaek Park, Seoul (KR); Dongryul Park, Seoul (KR); Chiyoung Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 314 days.

(21) Appl. No.: 18/537,408

(22) Filed: Dec. 12, 2023

(65) Prior Publication Data

US 2024/0200805 A1 Jun. 20, 2024

(30) Foreign Application Priority Data

Dec. 19, 2022 (KR) ........................ 10-2022-0177798

(51) Int. Cl.
*F24F 3/14* (2006.01)
*B01F 23/21* (2022.01)
(Continued)

(52) U.S. Cl.
CPC ................ *F24F 6/12* (2013.01); *B01F 23/21* (2022.01); *B01F 23/2133* (2022.01)

(58) Field of Classification Search
CPC .......... F24F 3/14; B01F 23/21; B01F 23/2133
See application file for complete search history.

(56) References Cited

U.S. PATENT DOCUMENTS 5,645,769 A 7/1997 Tamaru et al.
6,244,576 B1 6/2001 Tsai

FOREIGN PATENT DOCUMENTS

CN 104390304 B * 3/2017 ................ F24F 6/14
CN 211600985 9/2020
(Continued)

OTHER PUBLICATIONS

European Search Report dated May 6, 2024 issued in Application No. 23217819.4.

*Primary Examiner* — Robert A Hopkins
(74) *Attorney, Agent, or Firm* — KED & ASSOCIATES, LLP

(57) ABSTRACT

The present disclosure relates to a humidifier. A humidifier of the present disclosure includes: a case having an inlet and a outlet with an open top; a humidification reservoir disposed inside the case, that produces mist and has an open top so that the produced mist rises therethrough; a guide wall disposed above the humidification reservoir, that is spaced inward from the case and extends upward; a blower fan disposed below the humidification reservoir, that creates an ascending air stream within the case; and a diversion guide disposed on the top of the humidification reservoir, that divides the ascending air stream, wherein a blower flow path is formed between the humidification reservoir and the case, through which the ascending air stream flows, an inner discharge flow path is formed inside the guide wall, through which the mist produced in the humidification reservoir and part of the ascending air stream that has passed through the blower flow path flow, an outer discharge flow path is formed between the guide wall and the case, through which the rest of the ascending air stream that has passed through the blower flow path flows, and the diversion guide guides part of the ascending air stream that has passed through the blower flow path to the inner discharge flow path.

19 Claims, 11 Drawing Sheets

(51) Int. Cl.
*B01F 23/213* (2022.01)
*F24F 6/12* (2006.01)

(56) References Cited

FOREIGN PATENT DOCUMENTS

| | | | | |
|---|---|---|---|---|
| CN | 211600985 U | * | 9/2020 |
| JP | 2012-042161 | | 3/2012 |
| KR | 10-2253576 | | 5/2021 |
| WO | WO 2021/164366 | | 8/2021 |

* cited by examiner

HUMIDIFIER

CROSS-REFERENCE TO RELATED PATENT APPLICATIONS

This application claims priority to Korean Patent Application No. 10-2022-0177798, filed Dec. 19, 2022, whose entire disclosures are hereby incorporated by reference.

BACKGROUND

Field

The present disclosure relates to a humidifier.

Related Art

A humidifier is an appliance that releases humidified air containing large amounts of moisture by vaporizing water. The humidifier is able to create humidified air by vaporizing water by natural evaporation, evaporation by heating, ultrasonic vibration, etc.

Unlike natural evaporative humidifiers and heated evaporative humidifiers, ultrasonic humidifiers produce a mist by atomizing stored water via ultrasonic vibration. The mist produced by ultrasonic vibration is tiny droplets of water which themselves tend to sink down by gravitational force, making it difficult to smoothly supply them to an indoor space.

The "ultrasonic humidifier" disclosed in Korean Patent Registration No. 2253576 includes: a lower housing; an upper housing spaced upward from the lower housing to form an air inlet flow path, and having an outlet section with an open top; an annular water reservoir provided inside the upper housing, for storing water; a blower fan disposed in a hollow portion in the annular water reservoir; and an inner cover disposed above the blower fan, that covers the hollow portion in the annular water reservoir, wherein a discharge flow path is formed between the inner cover and an inner surface of the upper housing, which communicates with the outlet section.

The conventional humidifier is problematic in that it requires a complex humidification flow path in order to create a flow of humidified air by which an air stream formed by the blower fan passes through the water surface in the water reservoir and is discharged to the outlet section, together with mist.

Moreover, due to the complex humidification flow path, the structural design becomes complex, and the user will have difficulty cleaning the inside of the humidifier.

Another drawback is that, due to the complex humidification flow path, an air stream formed by the blower fan is not discharged via the water surface in the water reservoir, forming eddy currents swirling in the water reservoir. This will result in failing to supply the mist in the water reservoir smoothly into an indoor space through the outlet section.

Besides, the water stored in the water reservoir is immediately atomized without sterilization, which may lead to contamination of the indoor space and be potentially harmful to the health of people in the indoor space.

PRIOR ART DOCUMENTS

Patent Document

Korean Patent Registration Publication No. 10-2253576 B1 (filed on May, 18, 2021)

SUMMARY

The present disclosure is directed to providing a humidifier that facilitates the supply of mist to an indoor space.

Another aspect of the present disclosure is to provide a humidifier that has higher humidification capacity.

Yet another aspect of the present disclosure is to provide a humidifier that is simple in structure.

A further aspect of the present disclosure is to provide a humidifier that is simple in the way a flow of humidified air moves.

A further aspect of the present disclosure is to provide a humidifier that is easy to clean.

A further aspect of the present disclosure is to provide a humidifier that supplies humidified air in all directions of an indoor space.

A further aspect of the present disclosure is to provide a humidifier that distributes humidified air over a long distance.

A further aspect of the present disclosure is to provide a humidifier that has better sanitary performance.

A further aspect of the present disclosure is to provide a humidifier that makes the indoor space more pleasant.

A further aspect of the present disclosure is to provide a humidifier that enables the user to see the humidifier's operating state easily and visually from a long distance.

The aspects of the present disclosure are not limited to the foregoing, and other aspects not mentioned herein will be able to be clearly understood by those skilled in the art from the following description.

To accomplish the foregoing aspects, an exemplary embodiment of the present disclosure provides a humidifier including: a case having an inlet and a outlet with an open top; a humidification reservoir disposed inside the case, that produces mist and has an open top so that the produced mist rises therethrough; a guide wall disposed above the humidification reservoir, that is spaced inward from the case and extends upward; a blower fan disposed below the humidification reservoir, that creates an ascending air stream within the case; and a diversion guide disposed on the top of the humidification reservoir, that divides the ascending air stream.

A blower flow path may be formed between the humidification reservoir and the case, through which the ascending air stream flows.

An inner discharge flow path may be formed inside the guide wall, through which the mist produced in the humidification reservoir and part of the ascending air stream that has passed through the blower flow path flow.

An outer discharge flow path may be formed between the guide wall and the case, through which the rest of the ascending air stream that has passed through the blower flow path flows.

The diversion guide may guide part of the ascending air stream that has passed through the blower flow path to the inner discharge flow path.

The diversion guide may have a guide opening for allowing the blower flow path and the inner discharge flow path to communicate.

The guide opening may be slanted upward toward the inside.

The diversion guide may extend laterally upward.

The outlet may include an inner outlet communicating with the inner discharge flow path and an outer outlet communicating with the outer discharge flow path.

The case may include a discharge assembly disposed above the humidification reservoir, where the inner outlet and the outer outlet are formed.

The humidifier may further comprise a discharge panel disposed between the inner outlet and the outer outlet, by which the inner outlet and the outer outlet are separated.

The discharge assembly may include a discharge guide for guiding the mist and ascending air stream flowing through the inner discharge flow path to the inner outlet, wherein the discharge guide forms a tapered flow path whose area becomes smaller toward the top.

The case may include a guide shell spaced outward from the humidification reservoir and the guide wall.

The blower flow path may be formed between the guide shell and the humidification reservoir.

The outer discharge flow path may be formed between the guide shell and the guide wall.

The humidifier may further include a cylindrical tank disposed above the humidification reservoir, spaced inward from the guide wall.

The inner discharge flow path may be a flow path having an annular cross-section, that is formed between the tank and the guide wall.

The outer discharge flow path may be a flow path having an annular cross-section, that is formed between the guide wall and the guide shell.

The outlet may include: an annular inner outlet formed between the tank and the guide wall; and an annular outer outlet formed between the guide wall and the guide shell.

The humidification reservoir may include a plurality of diaphragms for producing mist.

The plurality of diaphragms may be arranged radially at the bottom of the humidification reservoir, spaced out from one another.

The humidifier may further include a heating reservoir having a reservoir heater for heating water and disposed at the center of the humidification reservoir.

The humidification reservoir may be spaced inward from the case and surround the heating reservoir.

The tank may be attached to the heating reservoir to supply water to the heating reservoir.

A mist flow path may be formed within the humidification reservoir, through which the mist produced in the humidification reservoir rises and exits the open top of the humidification reservoir, and the blower flow path and the mist flow path may be joined together at the discharge flow path.

Specific details of other embodiments are included in the detailed description and the drawings.

According to at least one of the embodiments of the present disclosure, a blower flow path through which an ascending air stream flows and a mist flow path through which mist produced in a humidification reservoir are joined together at a discharge flow path disposed above them, thereby facilitating the discharge of mist produced in the humidifier to a outlet formed at the top.

According to at least one of the embodiments of the present disclosure, the ascending air stream and the mist flow upward side by side, and a outlet is formed at a terminal point where the ascending air stream and the mist exit, thereby simplifying the flow of humidified air and facilitating the supply of mist to an indoor space.

According to at least one of the embodiments of the present disclosure, the blower flow path is formed along the outer periphery of the humidification reservoir with an open top, and the ascending air stream that has passed through the blower flow path carries the mist produced in the humidification reservoir, thereby increasing the humidification capacity and facilitating the supply of mist to an indoor space.

According to at least one of the embodiments of the present disclosure, a blower fan disposed below the humidification reservoir creates an ascending air stream, and the ascending air stream creates a negative pressure as it flows upward of the humidification reservoir, thereby allowing mist to rise and be smoothly supplied to an indoor space.

According to at least one of the embodiments of the present disclosure, the blower flow path and the mist flow path are placed side by side, and a discharge flow path is formed above the blower flow path and the mist flow path, which can simplify the structure of the humidifier, thereby enabling the user to easily wash the flow path section in the humidifier.

According to at least one of the embodiments of the present disclosure, the discharge assembly, the guide shell, the guide wall, the tank, the diversion guide, and the humidification reservoir can be separated from one another, thereby enabling the user to easily disassemble and wash the humidifier.

According to at least one of the embodiments of the present disclosure, the diversion guide guides an ascending air stream that has passed through the blower flow path upward of the humidification reservoir, thus forming a high negative pressure at the top of the humidification reservoir, whereby the mist produced in the humidification reservoir may rise and be smoothly supplied to the indoor space.

According to at least one of the embodiments of the present disclosure, the cylindrical humidification reservoir and the blower flow path formed along the outer periphery of the humidification reservoir allow the humidified air to be supplied uniformly in all directions of the indoor space.

According to at least one of the embodiments of the present disclosure, a discharge assembly having a tapered flow path allows the humidified air to be densely sprayed into the indoor space, and the user is able to visually and easily see the humidified air being sprayed at a high density from a long distance, and to see the operating state of the humidifier.

According to at least one of the embodiments of the present disclosure, the humidified air can be supplied uniformly in all directions of the indoor space by forming annular inner and outer outlets and inner and outer discharge flow paths having an annular cross-section.

According to at least one of the embodiments of the present disclosure, the tank disposed at the center of the inside of the guide wall guides the rising mist and the ascending air stream upward, thereby allowing the humidified air to flow upward smoothly without swirling within the case.

According to at least one of the embodiments of the present disclosure, a plurality of diaphragms are radially arranged at the bottom of the humidification reservoir, spaced apart from one another, thereby allowing the humidified air to be uniformly supplied in all directions of the indoor space.

According to at least one of the embodiments of the present disclosure, sterilized humidified air may be supplied into the indoor space, since the water supplied into the heating reservoir from the tank is supplied to the humidification reservoir after being sterilized.

The effects of the present disclosure are not limited to the foregoing, and other effects not mentioned herein will be able to be clearly understood by those skilled in the art from the following description.

DESCRIPTION OF EXEMPLARY EMBODIMENTS

Figure 1:
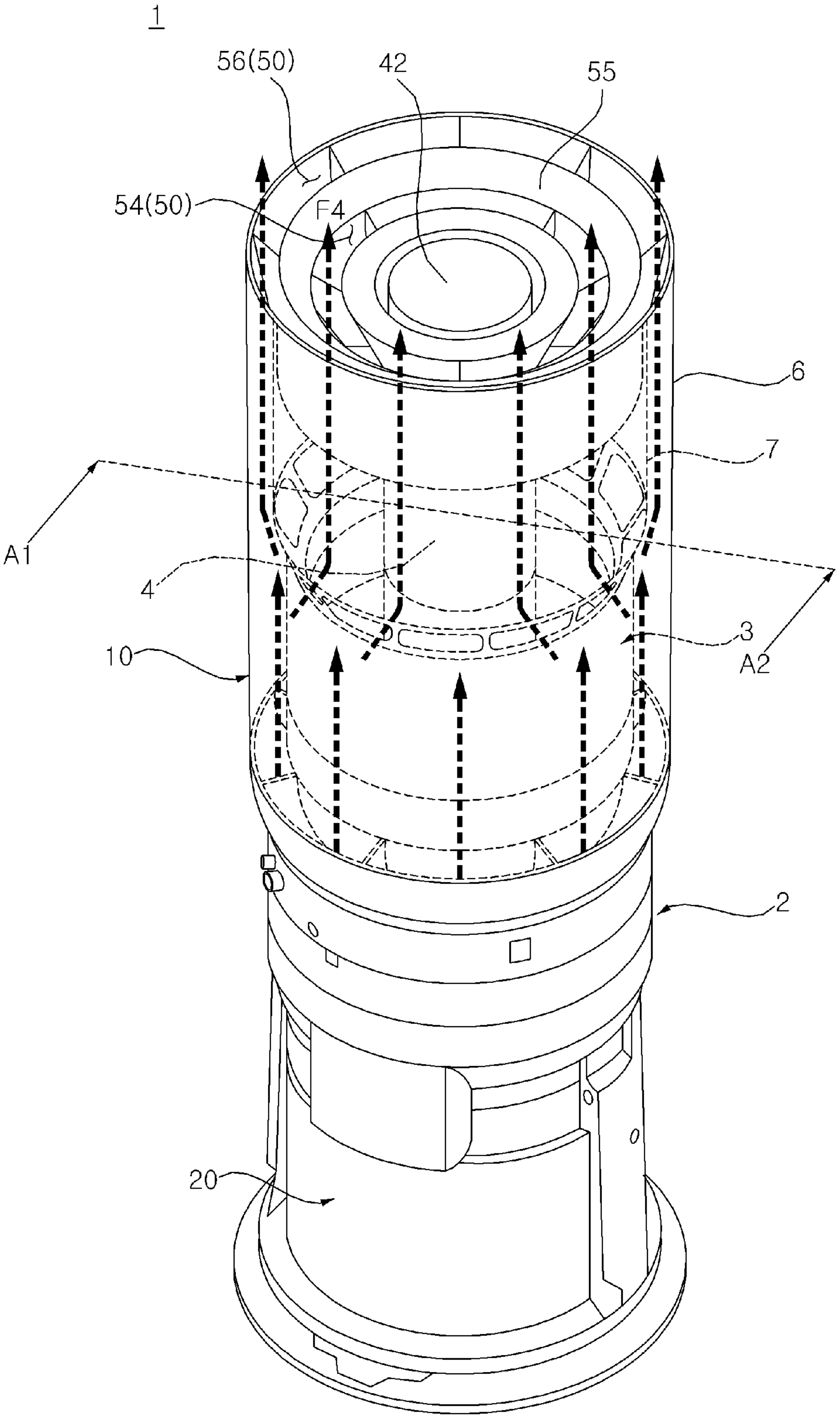
FIG. 1 is a perspective view of a humidifier according to an embodiment of the present disclosure.

Hereinafter, the embodiments disclosed in the present specification will be described in detail with reference to the accompanying drawings. The same or similar elements will be assigned the same reference numerals irrespective of the reference numerals, and redundant descriptions thereof will be omitted.

The suffixes "module", "unit", "part", and "portion" used to describe constituent elements in the following description are used together or interchangeably to facilitate the description, but the suffixes themselves do not have distinguishable meanings or functions.

In describing the embodiments disclosed in the present specification, a detailed description of a related known technology will be omitted when it is deemed that it may unnecessarily obscure the subject matter of the present disclosure. Also, it should be understood that the appended drawings are intended only to help understand the embodiments disclosed in the present specification and do not limit the technical idea disclosed in the present disclosure; rather, it should be understood that all changes, equivalents, and substitutions included in the technical scope and spirit of the present disclosure are included.

Terms such as 'first', 'second', etc., may be used to describe various components, but the components are not to be construed as being limited to the terms. The terms are used only to distinguish one component from another component.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween.

The singular expressions may include plural expressions unless the context clearly dictates otherwise.

A humidifier 1 will be described with reference to FIG. 1.

The humidifier 1 includes a case 10 forming its exterior. The case 10 may extend vertically. Mist may be produced in the case 10. A flow path through mist flows may be formed in the case 10.

An inlet 20 for drawing in air is formed in the case 10. The inlet 20 may be formed below the case 10. The inlet 20 may be formed along the periphery of the case 10. Indoor air may be drawn into the case 10 through the inlet 20. The drawn-in indoor air may flow upward by a blower fan 24 (see FIG. 3) to be described later.

A outlet 50 through which humidified air is discharged is formed in the case 10. The outlet 50 has an open top at the case 10. The outlet 50 may be formed through the top of the case 10 and have an open top. Indoor air admitted to the inside of the case 10 through the inlet 20 may flow upward and be discharged through the upwardly open outlet, and mist produced in the case 10 may be discharged through the outlet 50, along with the indoor air.

The inlet 20 and outlet 50 formed in the case 10 may be spaced apart from each other. For example, the inlet 20 may be formed in a lower part of the case 10, and the outlet 50 may be formed in an upper part of the case 10. Thus, air returning may be prevented by spacing an incoming air stream and an outgoing air stream apart from each other.

The outlet 50 may be annular. As the outlet 50 is annular, the produced mist may be distributed uniformly in all directions of the indoor space.

The outlet 50 may include an inner outlet 54 and an outer outlet 56.

The inner outlet 54 may be spaced apart from the center of the top of the case 10. The inner outlet 54 may extend along the periphery of the case 10. For example, the inner outlet 54 may be an annular inner outlet 54 that extends circumferentially along the periphery of a cylindrical case 10.

The outer outlet 56 may be formed along the periphery of the top of the case 10. For example, the outer outlet 56 may be an annular outer outlet 56 formed along the periphery of the top of the cylindrical case 10. The annular outer outlet 56 may be radially spaced from the annular inner outlet 54.

The inner outlet 54 and the outer outlet 56 may be spaced apart from each other. For example, the outer outlet 56 may be radially spaced from the inner outlet 54. Since the inner outlet 54 and the outer outlet 56 are spaced apart from each other, air discharged through the inner outlet 54 and air discharged through the outer outlet 56 may be separated from each other. For example, humidified air discharged from the inner outlet 54 and filtered air discharged from the outer outlet 56 may be discharged separately. The humidified air may be humid air containing mist, and the filtered air may be dry air not containing mist. Hereinafter, the term "humidified air" may refer to air containing mist.

The case 10 may include a discharge assembly 5 where the outlet 50 is formed. The outlet 50 may be open through the top of the discharge assembly 5. For example, air admitted to the underside of the discharge assembly 5 may pass through the discharge assembly 5 through the outlet 50 and exit through the top of the discharge assembly 50.

The discharge assembly 5 may guide an outgoing air stream.

The discharge assembly 5 may be disposed above a humidification reservoir 33. Mist produced in the humidification reservoir 33 may ascend, and the ascending mist may pass through the outlet 50 formed in the discharge assembly 5 and be supplied to the indoor space.

The inner outlet 54 and the outer outlet 56 may be formed in the discharge assembly 5. For example, the discharge assembly 5 may be open at the top through which the inner outlet 54 and the outer outlet 56 are formed.

The discharge assembly 5 may be cylindrical. The annular inner outlet 54 and the annular outer outlet 56 may be formed through the top of the discharge assembly 5, spaced apart from each other.

The discharge assembly 5 may include a discharge panel 55 by which the inner outlet 54 and the outer outlet 56 are separated from each other. The discharge panel 55 may be disposed between the inner outlet 54 and the outer outlet 56.

The discharge panel 55 may be annular. The annular discharge panel 55 may be disposed between the annular inner outlet 54 and the annular outer outlet 56. Since the annular outer outlet 56 is separated radially from the annular inner outlet 54 by the annular discharge panel 55, the humidified air discharged from the inner outlet 54 and the filtered air discharged from the outer outlet 56 may be discharged separately.

A tank cap 42 may be disposed at the top of the discharge assembly 5. The tank cap 42 may be attached to or detached from the discharge assembly 5. The tank cap 42 may cover the open top of the tank 4.

The tank cap 42 may be disposed at the center of the top of the discharge assembly 5. The tank cap 42 may be spaced inward from the inner outlet 54. The inner outlet 54 may be spaced radially from the tank cap 42, and may be formed circumferentially along the periphery of the tank cap 42. For example, the outer outlet 56, extending circumferentially along the periphery, and the inner outlet 54, spaced radially from the outer outlet 56 and extending circumferentially, may be formed at the top of the cylindrical discharge assembly 5, the discharge panel 55 may be disposed between the outer outlet 56 and the inner outlet 54, and the tank cap 42 may be disposed at the center of the top of the discharge assembly 5.

The humidifier 1 may include a blower assembly 2. The case 10 may include the blower assembly 2. The blower assembly 2 may form a lower part of the case 10. The blower assembly 2 may form an air stream flowing in the case 10.

The discharge assembly 5 may be disposed above the blower assembly 2. An ascending air stream formed in the blower assembly 2 may be discharged upward through the outlet 50 formed in the discharge assembly 5. Part of the ascending air stream formed in the blower assembly 2 may be discharged through the inner outlet 54 formed in the discharge assembly 5, and the rest of the ascending air stream formed in the blower assembly 2 may be discharged through the outer outlet 56. Air containing part of the ascending air stream discharged through the inner outlet 54 and mist produced in the humidification reservoir 33 may be humidified air. The rest of the ascending air stream may be filtered air.

The humidifier 1 may include a humidification assembly 3 that produces mist. The humidification assembly 3 may be disposed inside the case 10. The humidification assembly 3 may be disposed above the blower assembly 2, and the ascending air stream formed in the blower assembly 2 may cause the mist produced in the humidification assembly 3 to ascend.

The humidification assembly 3 may be open at the top. The mist produced in the humidification assembly 3 may ascend through the open top.

The humidification assembly 3 may be disposed below the discharge assembly 5, and the mist produced in the humidification assembly 3 may ascend together with the ascending air stream and be discharged through the outlet 50 formed in the discharge assembly 5.

The case 10 may include a guide shell 6 forming the exterior of the top. A flow path through which the ascending air stream formed in the blower assembly 2 flows may be formed inside the guide shell 6.

The blower assembly 2 may be disposed below the guide shell 6. The ascending air stream formed in the blower assembly 2 may flow through the flow path formed inside the guide shell 6. The guide shell 6 may guide the ascending air stream formed in the blower assembly 2.

The discharge assembly 5 may be coupled to the top of the guide shell 6. The discharge assembly 5 may be inserted into the guide shell 6, and be disposed above the open top of the guide shell 6. The discharge assembly 5 may form a top surface of the guide shell 6. The ascending air stream formed in the blower assembly 2 may rise through the flow path formed inside the guide shell 6, and be discharged upward through the outlet 50 formed in the discharge assembly 5.

The guide shell 6 may have the shape of a cylinder that extends upward. The flow path through which the ascending air stream formed in the blower assembly 2 flows may be formed along the inner periphery of the guide shell 6 and extend upward.

The guide shell 6 may be spaced outward from the humidification reservoir 33. The ascending air stream formed in the blower assembly 2 may flow between the guide shell 6 and the humidification reservoir 33. A blower flow path 330 may be formed between the guide shell 6 and the humidification reservoir 33. For example, a blower flow path 330 whose cross-section is annular may be formed between an inner peripheral surface of the guide shell 6 and an outer peripheral surface of the humidification reservoir 33. The blower flow path 330 may extend along the inner periphery of the guide shell 6. The blower flow path 330 may extend along the outer periphery of the humidification reservoir 33.

The guide shell 6 may form a discharge flow path 40 inside. The discharge flow path 40 may be positioned above the humidification assembly 3. The discharge flow path 40 may be positioned below the discharge assembly 5. The discharge flow path 40 may communicate with the outlet 50 formed in the discharge assembly 5. The mist produced in the humidification assembly 3 may flow upward through the discharge flow path 40, and be discharged through the outlet 50 formed in the discharge assembly 5 and supplied to the indoor space.

The humidifier 1 may include a tank 4 for storing water. The tank 4 may be disposed inside the case 10. The tank 4 may be attached to or detached from the case 10.

The tank 4 may be open at the top. The tank cap 42 may cover the open top of the tank 4. The tank cap 42 may be attached to or be detached from the tank 4.

The tank 4 may have the shape of a cylinder that extends upward. The tank 4 may be spaced inward from the guide shell 6. The discharge flow path 40 may be formed between the tank 4 and the guide shell 6. For example, a discharge flow path 40 whose cross-section is annular may be formed between a cylindrical tank 4 and a cylindrical guide shell 6. The outlet 50 may be adjacent to an upper end of the tank 4.

By disposing the tank 4 at the center of the discharge flow path 40, humidified air may flow upward smoothly within the case 10. The tank 4 may guide the humidified air within the case 10 upward. By disposing the tank 4 at the center of the discharge flow path 40, it is possible to reduce eddy currents which cause the humidified air to swirl in the discharge flow path 40 within the case 10.

The tank 4 may be disposed above the humidification reservoir 33. The tank may correspond in position to the center of the humidification reservoir. For example, the tank may extend upward from the center of the humidification reservoir. The tank may guide the mist produced in the humidification reservoir upward.

Figure 2:
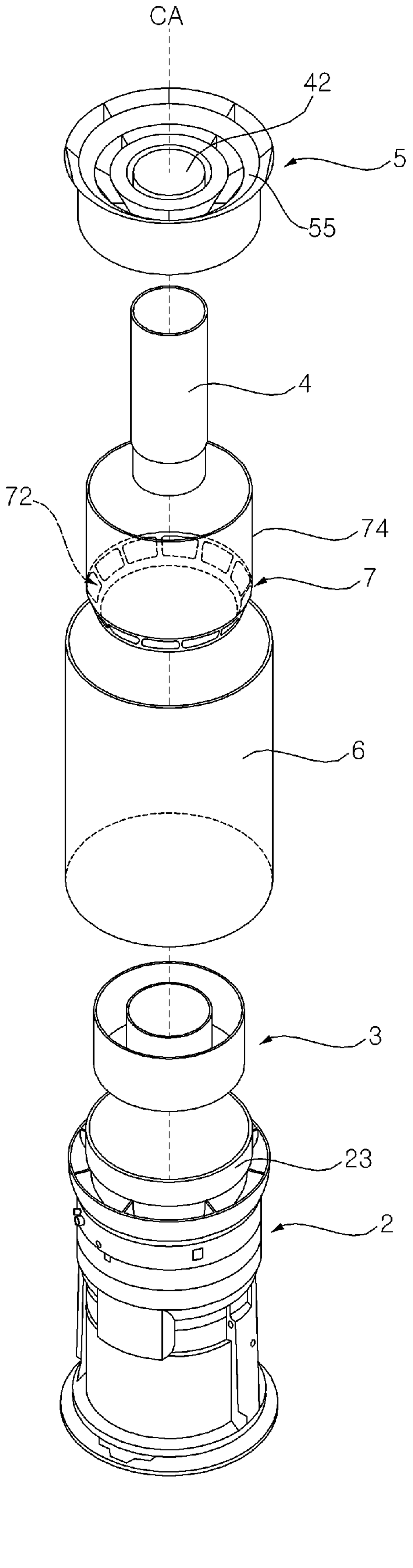
FIG. 2 is an exploded assembly diagram of a humidifier according to an embodiment of the present disclosure.

Referring to FIG. 2, the humidifier 1 will be described.

The blower assembly 2 may form an ascending air stream. The ascending air stream may flow within the case 10.

A bypass guide 23 may be disposed above the blower assembly 2. The bypass guide 23 may guide an ascending air stream blown from the blower assembly 2. The ascending air stream blown from the blower assembly 2 may rise along the outer periphery of the humidification assembly 3. The blower flow path 330 may be formed between the humidification assembly 3 and the guide shell 6, and the ascending air stream blown from the blower assembly 2 may flow and rise through the blower flow path 330.

The humidifier 1 may include a humidifier assembly 3 disposed inside the case 10. The humidification assembly 3 produces mist. The humidification assembly 3 may include a humidification reservoir 33 that produces mist. The humidification assembly 3 may store water for producing mist.

The humidification assembly 3 may be open at the top. The mist produced in the humidification assembly 3 may flow to the open top of the humidification assembly 3.

The humidification assembly 3 may be disposed above the blower assembly 3. The ascending air stream blown from the blower assembly 2 may cause the mist produced in the humidification assembly 3 to rise. That is, the ascending air stream blown from the blower assembly 2 may flow up along the outer periphery of the humidification assembly 3, and, may flow up above the humidification assembly 3.

The center axis CA of the humidification assembly may correspond in position to the position of the center axis CA of the blower assembly 2.

The guide shell 6 may have the shape of a cylinder that extends upward. The guide shell 6 may form the blower flow path. For example, the blower flow path 330 may be formed between the inner periphery of the guide shell 6 and the outer periphery of the humidification reservoir 33.

The center axis CA of the guide shell 6 may correspond in position to the center axis CA of the blower assembly 2. The center axis CA of the guide shell 6 may correspond in position to the center CA of the humidification assembly 3.

The guide shell 6 may form the discharge flow path 40. For example, the discharge flow path 40 may be formed between the inner periphery of the guide shell 6 and the outer periphery of the tank 4.

The humidifier 1 may include a diversion guide 7 for guiding an ascending air stream.

The diversion guide 7 may divide an ascending air stream. For example, the diversion guide 7 may divide an ascending air stream passing through the blower flow path 330 into an inner discharge flow path 70 and an outer discharge flow path 60. That is, part of the ascending air stream passing through the blower flow path 330 may enter the inner discharge flow path 70 by the diversion guide 7, and the rest of the ascending air stream passing through the blower flow path 330 may enter the outer discharge flow path 60.

The diversion guide 7 may divert the flow of an ascending air stream. For example, the diversion guide 7 may divert the flow of an ascending air stream passing through the blower flow path 330 from upward to diagonal. By means of the diversion guide 7, the ascending air stream passing through the blower flow path 330 may be diverted from a direction in which it flows up along the outer periphery of the humidification assembly 3 to a direction in which it flows up above the humidification assembly 3. That is, the diversion guide 7 may redirect the flow of an ascending air stream to a lateral direction. Since the diversion guide 7 directs an ascending air stream to flow up above the humidification assembly 3, the mist produced in the humidification assembly 3 may flow much further upward.

The diversion guide 7 is disposed on the top of the humidification assembly 3. The diversion guide 7 may be seated on the top of the humidification assembly 3. A lower end of the diversion guide 7 may be inserted into the open top of the humidification reservoir 33, and the diversion guide 7 may be seated on the humidification reservoir 33.

The diversion guide 7 may have a guide opening 72 through which at least part of the ascending air stream passing through the blower flow path 330 passes. The guide opening 72 may be an intake hole through which an ascending air stream entering the inner discharge flow path 70 passes. The guide opening 72 may be formed through the diversion guide 7. The guide opening 72 may be disposed along the periphery of the humidification reservoir 33. For example, the guide opening 72 may be disposed on an outer side along the outer periphery of an upper end of the humidification reservoir 33. As such, an ascending air stream flowing up along the outer periphery of the humidification reservoir 33 may enter the inner discharge flow path 70 through the guide opening 72. Alternatively, the ascending air stream flowing up along the outer periphery of the humidification reservoir 33 may be diverted to a direction in which it flows upward of the humidification reservoir 33 by means of the guide opening 72

The humidifier 1 includes a guide wall 74 for guiding the mist produced in the humidification reservoir 33. The guide wall 74 may guide the mist produced in the humidification reservoir 33 upward so that it rises. The guide wall 74 may guide the mist produced in the humidification reservoir 33 to the outlet 50.

The guide wall 74 may be disposed above the humidification assembly 3. The guide wall 74 may be disposed above the humidification reservoir 33. The guide wall 74 may be disposed above the humidification reservoir 33 and extend upward. The upwardly extending guide wall 74 may form a flow path through which the mist produced in the humidification reservoir 33 flows upward. For example, the guide wall 74 may have the shape of a cylinder that extends upward.

The center axis CA of the guide wall 74 may correspond in position to the center axis CA of the blower assembly 2, the center axis CA of the guide shell 6, and/or the center axis CA of the humidification assembly 3.

The guide wall 74 may be spaced inward from the case 10. The guide wall 74 may be spaced inward from the guide shell 6. A flow path may be formed between the guide wall 74 and the guide shell 6. For example, an annular outer discharge flow path 60 may be formed between a cylindrical guide wall 74 and a cylindrical guide shell 6.

The inner discharge flow path 70 may be formed inside the guide wall 74.

The outer periphery of the guide wall 74 may be positioned outward from the outer periphery of the humidification reservoir 33. That is, the radius of the guide wall 74 may be larger than the radius of the humidification reservoir 33. Thus, the mist produced in the humidification reservoir 33 may flow upward inside the guide wall 74. Also, the guide opening 72 may keep the mist produced in the humidification reservoir 33 from flowing out to the outer discharge flow path 60.

The humidifier 1 may include a tank 4 for storing water. The tank 4 may supply the stored water to the humidification reservoir 33.

The tank 4 may be disposed inside a case. The tank 4 may be disposed above the humidification reservoir 33. The tank 4 may be disposed above the humidification reservoir 33 and extend upward. The upwardly extending tank 4 may guide the mist produced in the humidification reservoir 33 upward. The upwardly extending tank 4 may form the discharge flow path 40. For example, the discharge flow path 40 may be formed between an outer peripheral surface of the tank 4 and an inner peripheral surface of the guide shell 6. Moreover, an inner discharge flow path 70 whose cross-section is annular may be formed between the outer peripheral surface of the tank 4 and an inner peripheral surface of the guide wall 74.

The tank 4 may guide the mist produced in the humidification reservoir 33 to the outlet 50. For example, the tank 4 may guide the mist produced in the humidification reservoir 33 to flow upward and be discharged through the inner outlet 54.

The tank 4 may be attached to and detached from the case 10. The tank 4 may be open at the top so as to be filled with water. The tank 4 may be disposed in an inner upper part of the case 10. The tank 4 may be pulled out upward from inside the case 10. The tank 4 may be pushed into the case 10 from outside the case 10.

The tank 4 may be spaced inward from the guide shell 6. The discharge flow path 40 may be formed between the guide shell 6 and the tank 4.

The tank 4 may be cylindrical. The tank 4 may have the shape of a cylinder that extends upward. An annular discharge flow path 40 may be formed between a cylindrical tank 4 and a cylindrical guide shell 6. An annular inner discharge flow path 70 may be formed between a cylindrical tank 4 and a cylindrical guide wall 74.

The center axis CA of the tank 4 may correspond in position to the center axis CA of the blower assembly 2, the center axis CA of the guide shell 6, the center axis CA of the guide wall 74, and/or the center axis CA of the humidification assembly 3.

The discharge assembly 5 may be disposed above the tank 4. The discharge assembly 5 may be inserted through the open top of the guide shell 6. The discharge assembly 5 may form an upper surface of the case 10.

Figure 3:
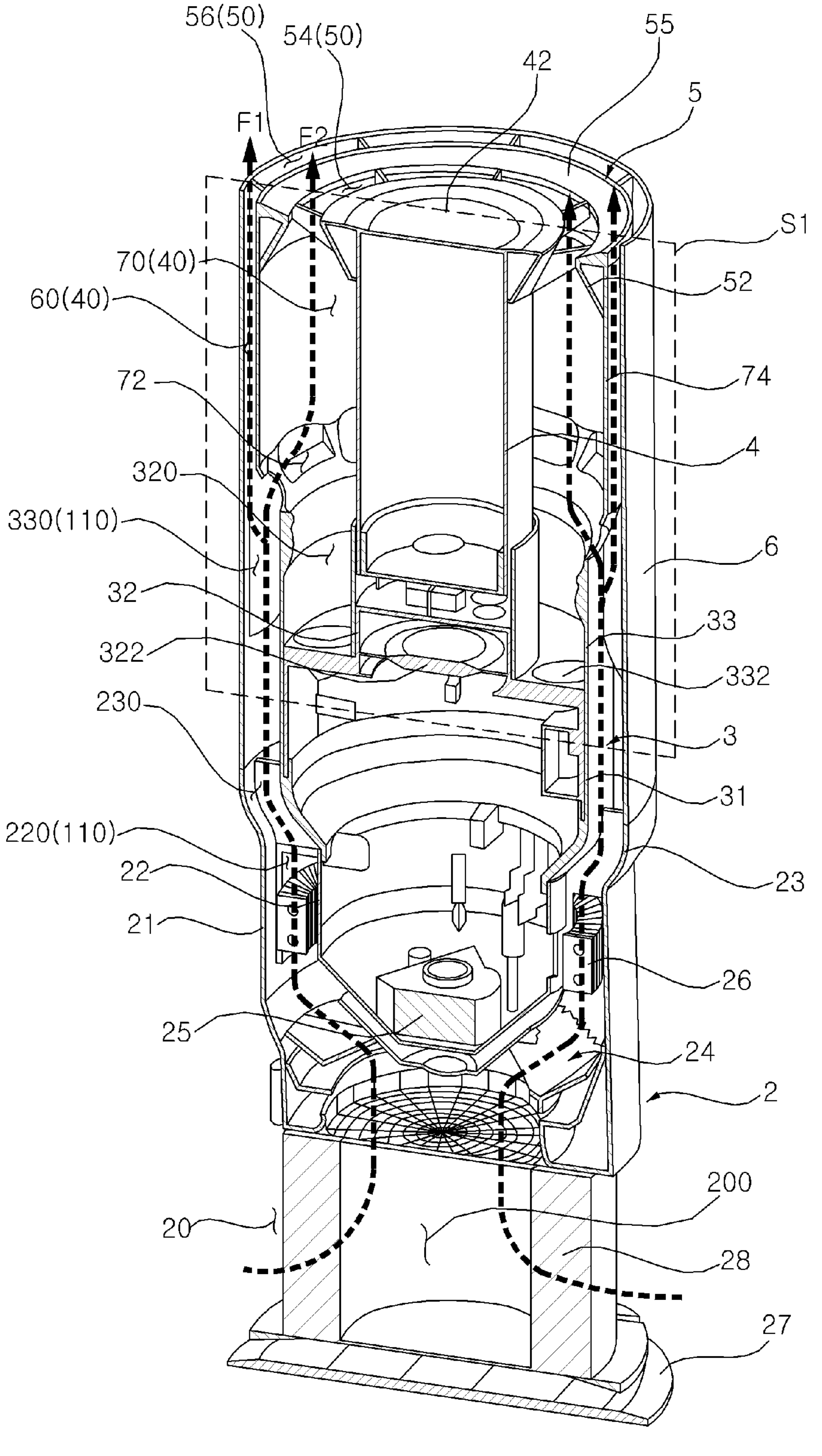
FIG. 3 is a cutaway cross-sectional view taken along the line A1-A2 in FIG. 1.

Referring to FIG. 3, the humidifier 1 will be described.

Air outside the humidifier 1 may be admitted into the case 10 through the inlet 20 formed in the case 10. For example, the inlet 20 may be formed along the periphery of the case 10, below the case 10.

The humidifier 1 may further include a filter 28 for filtering drawn-in air admitted into the case 10. The filter 28 may be disposed within the case 10. The filter 28 may be disposed inside the case 10 and extend along the inlet 20 formed in the case 10. For example, the inlet 20 may be formed in a lower part along the periphery of the case 10, and the filter 28 may be cylindrical. The filter 8 may face the inlet 20. As such, the air drawn in through the inlet 20 may be filtered by the filter 28.

An intake flow path 200 through which the drawn-in air flows may be formed within the case 10. The air drawn into the inlet 20 may flow through the intake flow path 200. The air flowing through the intake flow path 200 may enter the blower fan 24.

The humidifier 1 may include a blower fan 24 for forming an air stream. The blower fan 24 may form an air stream that flows upward within the case 10. The blower fan 24 may bring indoor air into the inlet 20, and the air may flow to the blower fan 24 through the intake flow path 200.

The blower assembly 2 may include the blower fan 24. The blower assembly 2 may include a blower motor 25 for rotating the blower fan 24. The blower assembly 2 may form an ascending air stream by rotating the blower fan 24.

The blower motor 25 may be disposed at the center of the blower assembly 2. The blower fan 24 may be disposed below the blower motor 25. The rotation axis of the blower motor 25 may correspond in position to the center axis of the blower assembly 2.

The blower fan 24 may be disposed below the humidification assembly 3. The blower fan 24 may be disposed below the humidification reservoir 33. The blower fan 24 may form an ascending air stream that flows to the humidification reservoir 33 disposed above it. The ascending air stream formed by the blower fan 24 may cause the mist produced in the humidification reservoir 33 to rise.

A sub flow path 220 through which the ascending air stream formed by the blower fan 24 flows may be formed in the blower assembly 2. The sub flow path 220 may be formed along the inner periphery of the blower assembly 2 and extend upward. The sub flow path 220 may be formed downstream of the blower fan 24. The sub flow path 220 may be formed above the blower fan 24. The sub flow path 220 may be formed outside the blower motor 25. The sub flow path 220 may be formed between the blower motor 25 and the inner periphery of the blower assembly 2.

Air admitted through the inlet 20 and flowing through the intake flow path 200 may flow through the sub flow path 220 by the blower fan 24.

The blower assembly 2 may include a blower housing 21 that forms the exterior. The blower motor 25 and the blower fan 24 may be disposed inside the blower housing 21. The blower housing 21 may form the blower flow path 330. The blower housing 21 may be cylindrical.

The blower assembly 2 may include a motor cover 22 where the blower motor 25 is disposed. The blower motor 25 may be disposed inside the motor cover 22. The blower fan 24 may be disposed outside the motor cover 22. For example, the blower fan 24 may be disposed below the motor cover 22, and the blower motor 25 for rotating the blower fan 24 may be disposed inside the motor cover 22. The motor cover 22 may be formed in a cylindrical shape.

The motor cover 22 may be spaced inward from an inner surface of the blower housing 21. A flow path may be formed between the motor cover 22 and the blower housing 21. The sub flow path 220 may be formed between the motor cover 22 and the case 10. For example, a sub flow path 220 whose cross-section is annular may be formed between an outer peripheral surface of a cylindrical motor cover 22 and an inner peripheral surface of a cylindrical blower housing 21.

The humidifier 1 may include a flow path heater 26 for heating an ascending air stream blown from the blower fan 24.

The flow path heater 26 may be disposed within the case 10. The flow path heater 26 may be disposed in the blower assembly 2. The flow path heater 26 may be disposed in the blower flow path 330 and/or the sub flow path 220. For example, the flow path heater 26 may be disposed in the sub flow path 220 to thereby heat an ascending air stream flowing through the sub flow path 220. As the heated ascending air stream moves up through the discharge flow path 40, mist may be evaporated.

Thus, the diameter of discharged droplets may be decreased.

Moreover, as the diameter of discharged droplets becomes smaller, mist may be distributed over long distances without sinking down by gravitational force.

In addition, since mist does not sink down around the humidifier by gravitational force, the area around the humidifier will not get wet even if the humidifier is run for a long period of time.

Furthermore, the humidifier facilitates the supply of mist to the indoor space.

Besides, drops in temperature in the indoor space can be alleviated.

The humidifier 1 may include a bypass guide 23 for guiding an ascending air stream blown from the blower fan 24 to the blower flow path 330. The case 10 may include the bypass guide 23.

The bypass guide 23 may be disposed between the blower fan 24 and the humidification reservoir 33. The bypass guide 23 may guide the ascending air stream blown from the blower fan 24 to the outer periphery of the humidification reservoir 33. Thus, despite the difference in radius between the blower assembly and the humidification assembly, the ascending air stream blown from the blower assembly may rise smoothly along the outer periphery of the humidification reservoir. Moreover, the formation of eddy currents within the case can be reduced. In addition, flow disturbances within the case can be reduced.

The bypass guide 23 may form a bypass flow path 230 through which an ascending air stream flows. The bypass flow path 230 may be positioned between the sub flow path 220 and the blower flow path 330. The bypass flow path 230 may connect the sub flow path 220 and the blower flow path 330. The bypass flow path 230 may be positioned downstream of the sub flow path 220. The bypass flow path 230 may be positioned upstream of the blower flow path 330.

As an ascending air stream flowing through the sub flow path 220 passes through the bypass flow path 230, it may make a bypass to flow outward and enter the blower flow path 330. The bypass flow path 230 may extend upward. The bypass flow path 230 may extend laterally toward the top. The perimeter of an upper end of the bypass flow path 230 may be larger than the perimeter of a lower end of the bypass flow path 230. Thus, the bypass flow path may connect the sub flow path which is smaller in radius and positioned under it and the overlying blower flow path which is larger in radius and positioned over it.

The humidification assembly 3 may be disposed above the blower fan 24.

A humidification housing 31 may form the outer periphery of the humidification assembly 3. The humidification housing 31 may form the outer periphery of the humidification reservoir 33.

The humidification assembly 3 may include a humidification housing 31 forming the outer periphery and a humidification reservoir 33 formed inside the humidification housing 31.

The humidification housing 31 may extend vertically. The humidification housing 31 may be disposed above the motor cover 22. The humidification housing 31 may be disposed above the bypass guide 23. The humidification housing 31 may extend upward from the bypass guide 23. The humidification housing 31 may have the shape of a cylinder that extends vertically.

The humidification housing 31 may be spaced inward from an inner surface of the case 10. For example, a cylindrical humidification housing 31 may be spaced inward from a cylindrical guide shell 6.

The humidification housing 31 may form the blower flow path 330. The blower flow path 330 may be formed between the humidification housing 31 and the case 10. The blower flow path 330 may be formed between the humidification housing 31 and the guide shell 6. For example, the blower flow path 330 may be formed between an outer peripheral surface of the humidification housing 31 and an inner peripheral surface of the guide shell 6.

A cross-section of the blower flow path 330 may be annular. The blower flow path 330 having an annular cross-section may extend upward.

The humidifier 1 may include a humidification reservoir 33 disposed inside the case 10, for generating mist. The humidification assembly 3 may include a humidification reservoir 33. The humidification reservoir 33 may produce mist.

The humidification reservoir 33 may be cylindrical. The humidification reservoir 33 may extend upward.

The humidification reservoir 33 may be open at the top to allow the produced mist to rise therethrough.

The humidification reservoir 33 may store water for producing mist. The humidification reservoir 33 may have a bottom for storing water. The bottom of the humidification reservoir 33 may be formed inside the humidification housing 31. The bottom of the humidification reservoir 33 may be annular.

The humidification reservoir 33 may have a mist flow path 320 through which the produced mist rises. The mist flow path 320 may extend vertically within the humidification reservoir 33. The mist flow path 320 may communicate with the open top of the humidification reservoir 33. A cross-sectional shape of the mist flow path 420 may correspond to a cross-sectional shape of the bottom of the humidification reservoir 33.

The diversion guide 7 may guide part of the ascending air stream that has passed through the blower flow path 330 to the inner discharge flow path 70. The diversion guide 7 may divide the ascending air stream that has passed through the blower flow path 330. For example, by means of the diversion guide 7, the ascending air stream blown from the blower fan 24 may be divided into a first outgoing air stream F1 that flows up and exits the outer discharge flow path 60 and a second outgoing air stream F2 that flows up and exits the inner discharge flow path 70. The second outgoing air stream F2 may enter the inner discharge flow path 70 and rise above the humidification reservoir 33. As the second outgoing air stream F2 flows upward of the humidification reservoir 33, it may carry the mist produced in the humidification reservoir 33 upward. Thus, humidified air may flow up the inner discharge flow path 70.

The diversion guide 7 may have a guide opening 72 for allowing the blower flow path 330 and the inner discharge flow path 70 to communicate. At least part of the ascending air stream that has passed through the blower flow path 330 may enter the guide opening 72, and the rest of the ascending air stream may flow up the outer discharge flow path 60.

The diversion guide 7 may have an annular shape that extends around the periphery of the humidification reservoir 33. The guide opening 72 may be formed through the annular diversion guide 7.

A plurality of openings 72 may be provided. The plurality of guide openings 72 may be disposed around the periphery of the humidification reservoir 33.

The discharge flow path 40 may be formed between the case 10 and the tank 4. The discharge flow path 40 may be formed between the guide shell 6 and the tank 4. The discharge flow path 40 may be a single flow path formed between the tank 4 and the guide shell 6. In the case where a single discharge flow path 40 is formed, the diversion guide 7 may guide the ascending air stream that has passed through the blower flow path 330 upward of the humidification reservoir 33. In the case where a single discharge flow path 40 is formed, the diversion guide 7 may not divide the ascending air stream.

The guide wall 74 may divide the discharge flow path 40. In this case, the discharge flow path 40 may be a dual flow path. The discharge flow path 40 may include an outer discharge flow path 60 formed between the guide shell 6 and the guide wall 74 and an inner discharge flow path 70 formed inside the guide wall 74. The inner discharge flow path 70 may be formed between the guide wall 74 and the tank 4. In the case where a dual discharge flow path 40 is formed, the diversion guide 7 may divide an ascending air stream that has passed through the blower flow path 330.

At least one of the ascending air stream blown from the blower fan 24 or the mist produced in the humidification reservoir 33 may flow through the discharge flow path 40.

The discharge flow path 40 may have an annular cross-section and extend upward. An upper end of the discharge flow path 40 may communicate with the outlet 50. Alternatively, the upper end of the discharge flow path 40 may communicate with a tapered flow path 58.

The discharge flow path 40 may communicate with the open top of the humidification reservoir 33. The mist produced in the humidification reservoir 33 may rise through the open stop of the humidification reservoir 33 and flow through the discharge flow path 40.

The discharge flow path 40 may communicate with the blower flow path 330. At least part of the ascending air stream that has passed through the blower flow path 330 may enter and flow through the discharge flow path 40. The diversion guide 7 may be disposed between the discharge flow path 40 and the blower flow path 330. The guide opening 72 formed through the diversion guide 7 may allow the discharge flow path 40 and the blower flow path 330 to communicate.

The guide wall 74 may be spaced inward from the guide shell 6. The guide wall 74 may divided the discharge flow path 40 into the inner discharge flow path 70 and the outer discharge flow path 60. For example, the inner discharge flow path 70 may be formed inside the guide wall 74, and the outer discharge flow path 60 may be formed outside the guide wall 74.

The guide shell 6 may be spaced outward from the guide wall 74. The guide shell 6 may form the exterior of the case 10. For example, a cylindrical guide shell 6 may form the exterior of an upper part of the case 10.

A flow path through which an ascending air stream formed by the blower fan 24 flows may be formed inside the guide shell 6. The discharge flow path 40 may be formed inside the guide shell 6. The discharge flow path 40 may be formed along the inner periphery of the guide shell 6 and extend upward.

The guide shell 6 may form the blower flow path 330. The blower flow path 330 may be formed between the guide shell 6 and the humidification reservoir 33. For example, the blower flow path 330 may be formed between an inner peripheral surface of the guide shell 6 and an outer peripheral surface of the humidification reservoir 33, and an ascending air stream formed by the blower fan 24 may pass through the blower flow path 330 and flow above the humidification reservoir 33.

The guide shell 6 may form the discharge flow path 40. The guide shell 6 may form a single discharge flow path 40. For example, a single discharge flow path 40 having a circular cross-section may be formed inside the guide shell 6. Alternatively, a single discharge flow path 40 having an annular cross-section may be formed between an inner peripheral surface of the guide shell 6 and an outer peripheral surface of the tank 4.

The guide shell 6 may form a portion of the discharge flow path 40. The discharge flow path 40 may be a dual flow path. The discharge flow path 40 may include an inner discharge flow path 70 and an outer discharge flow path 60. The guide shell 6 may form the outer discharge flow path 60. For example, an outer discharge flow path 60 having an annular cross-section may be formed between the guide shell 6 and the guide wall 74.

The tank 4 may be spaced inward from the guide wall 74. The tank 4 may extend upward. The top of the tank 4 may be open. Water for producing mist may be supplied through the open top of the tank 4. The tank cap 42 may cover the open top of the tank 4.

The tank 4 may guide at least one of the ascending air stream blown from the blower fan 24 and the mist produced in the humidification reservoir 33 upward. The tank 4 may guide humidified air to the outlet 50. Since the vertically extending tank 4 is disposed at the center of the inner discharge flow path 70, the flow of humidified air may be simplified.

Therefore, the formation of eddy currents in the inner discharge flow path can be reduced.

Moreover, the flow of humidified air in the inner discharge flow path can be facilitated.

The tank 4 may be inserted into the open top of the humidification reservoir 33 and disposed at the center of the humidification reservoir 33. The tank 4 may be attached to the humidification reservoir 33 and supply the humidification reservoir 33 with water for producing mist.

The tank 4 may be disposed at the center of the humidification reservoir 33. The humidification reservoir 33 may be formed along the outer periphery of the tank 4. That is, the humidification reservoir 33 may surround the tank 4.

The inner discharge flow path 70 may be formed between the tank 4 and the guide wall 74. The inner discharge flow path 70 may be formed along the inner periphery of the guide wall 74. The inner discharge flow path 70 may by be formed along the outer periphery of the tank 4. The inner discharge flow path 70 may extend upward. The inner discharge flow path 70 may have an annular cross-section.

The mist produced in the humidification reservoir 33 may flow in the inner discharge flow path 70.

Part of the ascending air stream that has passed through the blower flow path 330 may enter the inner discharge flow path 70. The ascending air stream that has entered the inner discharge flow path 70 may cause the mist to rise.

The outer discharge flow path 60 may be formed between the guide wall 74 and the case 10. The outer discharge flow path 60 may be formed along the outer periphery of the guide wall 74. The outer discharge flow path 60 may be formed along the inner periphery of the guide shell 6. The outer discharge flow path 60 may have an annular cross-section.

The rest of the ascending air stream that has passed through the blower flow path 330, other than the part admitted to the inner discharge flow path 70, may enter the outer discharge flow path 60.

The outlet 50 may be formed between the tank 4 and the case 10. For example, the outlet 50 may be formed between an upper end of the tank 4 and an upper end of the case 10.

The outlet 50 may communicate with the discharge flow path 40. The outlet 50 may be positioned at one end of the discharge flow path 40. For example, the outlet 50 may be positioned at an upper end of the discharge flow path 40.

In a case where a single discharge flow path 40 is formed, a single outlet 50 may be formed.

In a case where a dual discharge flow path 40 is formed, a dual outlet 50 may be formed. The dual outlet 50 may include an inner outlet 54 and an outer outlet 56.

The inner outlet 54 may communicate with the inner discharge flow path 70. Humidified air may be discharged through the inner outlet 54. The inner outlet 54 may be spaced upward from the humidification reservoir 33. For example, the inner outlet 54 may be positioned between the upper end of the tank 4 and an upper end of the guide wall 74.

The outer outlet 56 may communicate with the outer discharge flow path 60. Filtered air may be discharged through the outer outlet 56. The outer outlet 56 may be positioned above the outer discharge flow path 60 and the blower flow path 330. The outer outlet 56 may be formed between the guide wall 74 and the guide shell 6. For example, the outer outlet 56 may be positioned between the upper end of the guide wall 74 and an upper end of the guide shell 6.

The discharge assembly 5 may include a discharge guide 53 for guiding the mist and ascending air stream flowing in the inner discharge flow path 70 to the inner outlet 54. The inner outlet 54 may be formed at one end of the discharge guide 52. For example, the inner outlet 54 may be formed at an upper end of the discharge guide 52.

The discharge guide 52 may be disposed in the discharge flow path 40. The discharge guide 52 may be disposed in an upper part of the discharge flow path 40. For example, the discharge guide 52 may be disposed in an upper part of the inner discharge flow path 70, and humidified air to be discharged through the inner outlet 54 may flow along the discharge guide 52.

Figure 4:
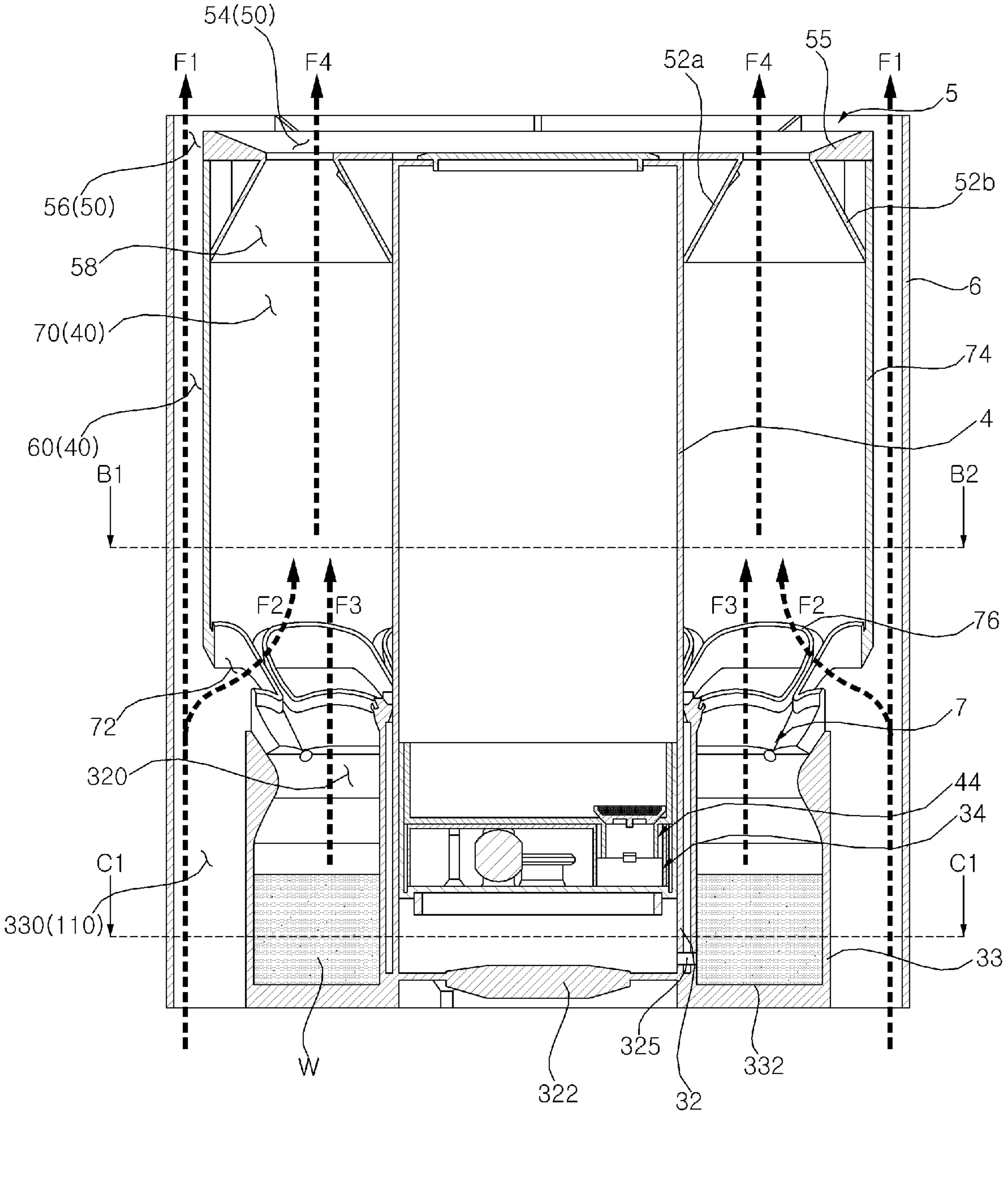
FIG. 4 is a cutaway cross-sectional view of the region S1 in FIG. 3.

Referring to FIG. 4, the humidifier 1 will be described.

The humidifier 1 may include a heating reservoir 32 for heating water. The humidification assembly 3 may include a heating reservoir 32. The heating reservoir 32 may be supplied with water from the tank 4. The heating reservoir 32 may sterilize the supplied water by heating. The water sterilized in the heating reservoir 32 may be supplied to the humidification reservoir 33. Since the water from which the humidification reservoir 33 produces mist is heated in the heating reservoir 32, the humidifier may have better sanitary performance.

Therefore, the indoor space can be kept more pleasant.

The heating reservoir 32 may have a reservoir heater 322 for heating water. The reservoir heater 322 may be disposed at the bottom of the heating reservoir 32. The reservoir heater 322 may heat the water stored in the heating reservoir 32.

The heating reservoir 32 may be disposed at the center of the humidification reservoir 33. The humidification reservoir 33 may surround the heating reservoir 32. For example, a cylindrical heating reservoir 32 may be disposed at the center of the humidification reservoir 33, and the humidification reservoir 33 may have the shape of a cylinder that extends along the outer periphery of the heating reservoir 32.

The tank 4 may be attached to the heating reservoir 32. The tank 4 may be disposed above the heating reservoir 32. The tank 4 may supply water to the heating reservoir 32, and the heating reservoir 32 may heat the water supplied from the tank 4.

The humidification reservoir 33 may surround the heating reservoir 32. The humidification reservoir 33 may produce mist from the water supplied from the tank 4 or the heating reservoir 33. The produced mist may rise and flow to the open top of the humidification reservoir 33.

The humidification reservoir 33 may have an internal space where water is stored. The mist produced in the humidification reservoir 33 may flow in the inner space. The internal space may be formed inside the humidification reservoir 33. The internal space may surround the heating reservoir 32 or the tank 4. The mist produced from the water stored in the internal space may rise, and the tank 4 may guide the rising mist upward.

The internal space of the humidification reservoir 33 may extend upward and communicate with the open top of the humidification reservoir 33. The internal space may include a mist flow path 320 which communicates with the open top of the humidification reservoir 33. The mist flow path 320 may extend upward. The mist produced in the humidification reservoir 33 may flow upward through the mist flow path 320.

The mist flow path 320 may surround the tank 4 or the heating reservoir 32. The mist flow path 320 may be at least a portion of the internal space of the humidification reservoir 33.

The humidification reservoir 33 may be cylindrical. The heating reservoir 32 and/or the tank 4 may be disposed at the center of the humidification reservoir 33, and the humidification reservoir 33 may have an annular cross-section.

The humidification reservoir 33 may include a diaphragm 332 for atomizing the stored water. The diaphragm 332 may break the water stored in the humidification reservoir 33 into fine particles and produce mist.

The tank 4 may supply water to the heating reservoir 32 and/or the humidification reservoir 33. The tank 4 may be attached to the heating reservoir 32. Alternatively, the tank 4 may be attached to the humidification reservoir 33.

The tank 4 may be spaced inward from the case 10. The tank 4 may extend upward and form the discharge flow path 40. The upper end of the tank 4 may form the outlet 50.

The tank 4 may be attached to the heating reservoir 32 and supply water. The tank 4 may include a feeder 44 for supplying water. The feeder 44 may be connected to the bottom of the tank 4, and feed the water stored in the tank 4 to the humidification reservoir 3. The feeder 44 may be disposed below the tank 4.

The humidification assembly 3 may include an intake unit 34 corresponding to the feeder 44 of the tank 4. The intake unit 34 may be disposed above the humidification assembly 3. The intake unit 34 may be coupled to the feeder 44. The feeder 44 may be coupled to the intake unit 34, and the water stored in the tank 4 may be supplied to the heating reservoir 32.

The water heated in the heating reservoir 32 may be supplied to the humidification reservoir 33. The humidification assembly 3 may include a connecting duct 325 that connects the heating reservoir 32 and the humidification reservoir 33. The water heated in the heating reservoir 32 may be supplied to the humidification reservoir 33, and the water supplied to the humidification reservoir 33 may be atomized by the diaphragm 332.

The discharge flow path 40 may be positioned above the blower flow path 330. An ascending air stream that has passed through the blower flow path 330 may enter the discharge flow path 40.

The discharge flow path 40 may be positioned above the internal space formed in the humidification reservoir 33. The mist produced in the humidification reservoir 33 may pass through the mist flow path 320 and enter the discharge flow path 40.

The blower flow path 330 and the mist flow path 320 may be joined together at the discharge flow path 40. The ascending air stream that has passed through the blower flow path 330 may cause the mist produced in the humidification reservoir 33 to rise, and the ascending air stream and the mist may flow through the discharge flow path 40. Air containing the ascending air stream and the mist may be called humidified air.

The discharge flow path 40 may extend upward and communicate with the outlet 50. The humidified air may flow upward along the discharge flow path 40 and be discharged through the outlet 50.

The diversion guide 7 may divide the ascending air stream that has passed through the blower flow path 330. The diversion guide 7 may guide at least part of the ascending air stream that has passed through the blower flow path 330 to the discharge flow path 40. For example, the ascending air stream that has passed through the blower flow path 330 may be divided into a first outgoing air stream F1 that flows through the outer discharge flow path 60 and a second outgoing air stream F2 that flows through the inner discharge flow path 70. The second outgoing air stream F2 may flow upward of the humidification reservoir 33, and a relative negative pressure may be formed above the humidification reservoir 33. The mist produced in the humidification reservoir 33 may flow upward of the humidification reservoir 33 where the negative pressure is formed. That is, a mist flow F3 may be formed which flows to the open top of the humidification reservoir 33. The second outgoing air stream F2 and the mist flow F3 may combined together to form a humidified air stream F4. The humidified air stream F4 may flow upward along the inner discharge flow path 70 and be discharged through the inner outlet 54.

The diversion guide 7 may guide the ascending air stream that has passed through the blower flow path 330 upward of the humidification reservoir 33. For example, the diversion guide 7 may guide the second outgoing air stream F2 upward of the humidification reservoir 33.

The diversion guide 7 may be disposed on the top of the humidification reservoir 33. The diversion guide 7 may extend laterally upward. The diversion guide 7 may extend downward toward the inside. The diversion guide 7 may be slanted. The diversion guide 7 may have a larger perimeter toward the top. The diversion guide 7 may have a larger cross-section toward the top. The perimeter of an upper end of the diversion guide 7 may be larger than the perimeter of a lower end thereof.

As the humidified air flows upward through the discharge flow path 40, condensate water may be produced on the discharge flow path 40. Since the diversion guide 7 is slanted downward toward the inside, the condensate water produced above the diversion guide 7 may flow along the slant surface of the diversion guide 7.

The diversion guide 7 may be placed on the top of the humidification reservoir 33. The bottom of the diversion guide 7 may be open. The open bottom of the diversion guide 7 may communicate with the open top of the humidification reservoir 33.

The diversion guide 7 may have an annular shape that extends around the periphery of the humidification reservoir 33. The perimeter of a lower end of the diversion guide 7 may be smaller than the perimeter of an upper end of the humidification reservoir 33. The perimeter of the upper end of the diversion guide 7 may be larger than the perimeter of the upper end of the humidification reservoir 33. The lower end of the diversion guide 7 may be inserted into the open top of the humidification reservoir 33.

Accordingly, the condensate water flowing along the slant surface of the diversion guide 7 may drip into the humidification reservoir 33.

The guide opening 72 may guide at least part of the ascending air stream to the discharge flow path 40. The guide opening 72 may be spaced laterally upward from the upper end of the humidification reservoir 33. The guide opening 72 may be a plurality of guide openings 72 disposed around the periphery of the humidification reservoir 33.

The discharge guide 52 may include an inner discharge guide 52*a* and an outer discharge guide 52*b*. The inner discharge guide 52*a* may be spaced inward from the outer discharge guide 52*b*. The outer discharge guide 52*b* may be spaced outward from the inner discharge guide 52*a*. The outer discharge guide 52*b* may be disposed below the discharge panel 55. The outer discharge guide 52*b* and the inner discharge guide 52*a* may form the inner outlet 54. For example, an upper end of the outer discharge guide 52*b* and an upper end of the inner discharge guide 52*a* may form the inner outlet 54.

The discharge guide 52 may form a tapered flow path 58 whose area becomes smaller toward the top. The area of the tapered flow path 58 becomes smaller from upstream to downstream. The outlet 50 may be positioned at one end of the tapered flow path 58. The other end of the tapered flow path 58 may be connected to the discharge flow path 40. For example, an upper end of the tapered flow path 58 may form the outlet 50, and a lower end of the tapered flow path 58 may be connected to the discharge flow path 40. Since the surface of the tapered flow path 58 becomes smaller from upstream to downstream, the density of the humidified air to be discharged may increase.

Therefore, the user is able to see the humidifier's operating state easily and visually from a long distance.

The outer discharge guide 52*b* and the inner discharge guide 52*a* may form the tapered flow path 58. The outer discharge guide 52*b* may be slanted inwardly upward. The inner discharge guide 52*a* may be slanted outwardly upward. The inner discharge guide 52*a* may be slanted radially upward. The distance between the inner discharge guide 52*a* and the outer discharge guide 52*b* may become smaller toward the top.

The diversion guide 7 may include a water collection guide 76 protruding from the periphery of the guide opening 72. The condensate water D (see FIG. 5) produced in the discharge flow path 40 may flown down the slant surface of the diversion guide 7, and the water collection guide 76 may stop the condensate water D from dripping through the guide opening 72. Thus, the water collection guide 76 may guide the condensate water D so as to drip into the humidification reservoir 33. That is, the water collection guide 76 may guide the condensate water D so as not to escape through the guide opening 72.

The water collection guide 76 may protrude toward the discharge flow path 40. For example, the water collection guide 76 may protrude upward.

Figure 5:
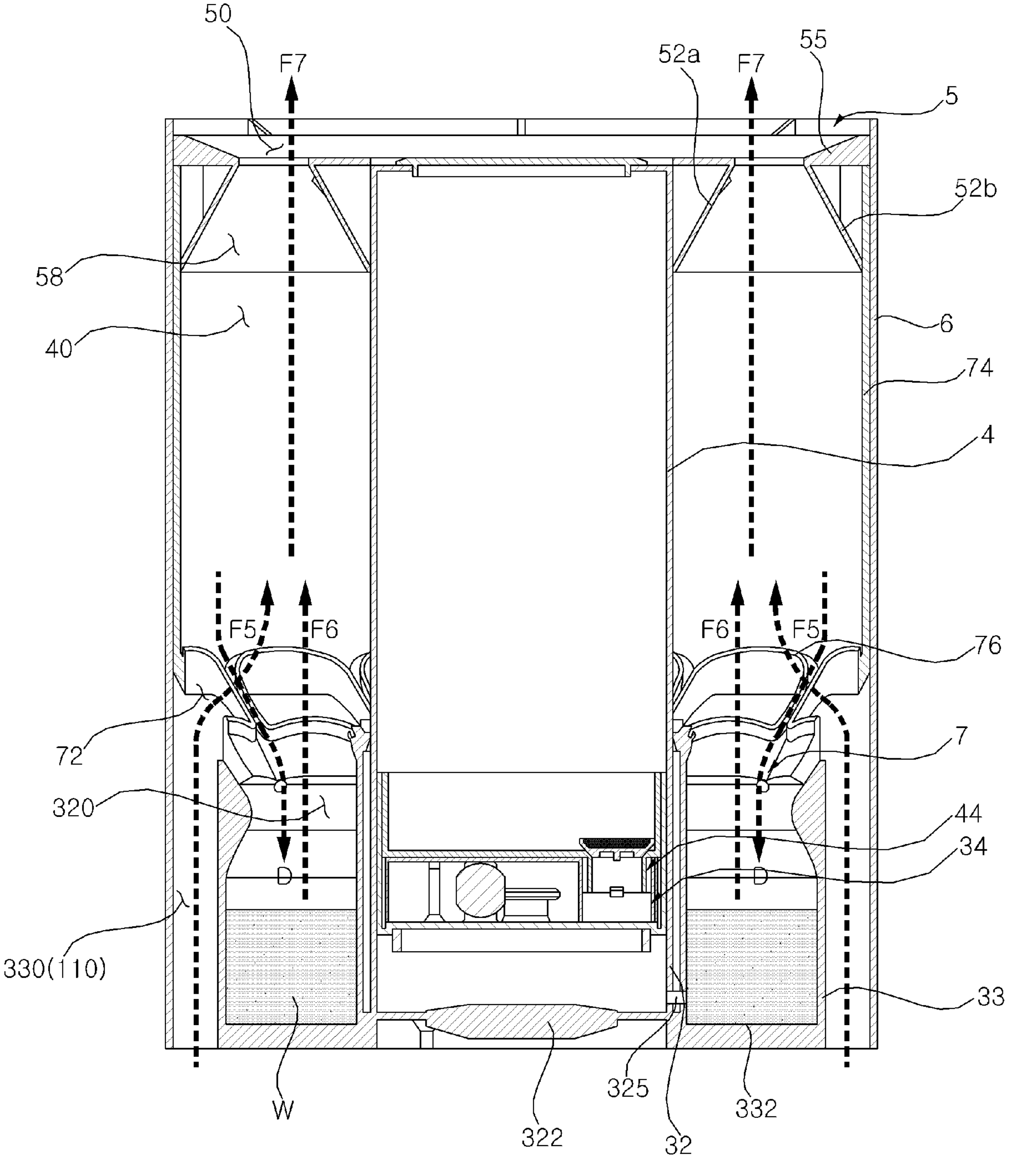
FIG. 5 is a cutaway cross-sectional view of a humidifier according to another embodiment of the present disclosure.

Referring to FIG. 5, the humidifier 1 will be described.

The discharge flow path 40 may be a single discharge flow path 40. The single discharge flow path 40 may be formed inside the case 10. The single discharge flow path 40 may be formed between the tank 4 and the guide shell 6. For example, the single discharge flow path 40 may be formed between an outer peripheral surface of the tank 4 and an inner peripheral surface of the guide shell 6, and have an annular cross-section.

The diversion guide 7 may guide the ascending air stream that has passed through the blower flow path 330 upward of the humidification reservoir 33. The diversion guide 7 may divert the direction of flow such that the ascending air stream that has passed through the blower flow path 330 flows upward of the humidification reservoir 33. That is, the diversion guide 7 may create an outgoing air stream F5 that rises above the humidification reservoir 33. The outgoing air stream F5 may join with a mist flow F6 rising along the mist flow path in the humidification reservoir, to thereby form a humidified air stream F7. The humidified air stream F7 may rise along the discharge flow path 40 and be discharged through the outlet 50.

The guide wall 74 may be tightly attached to the guide shell 6. In this case, a single discharge flow path 40 may be formed between the guide wall 74 and the tank 4. As the guide wall 74 is tightly attached to the guide shell 6, no flow path may be formed between the guide wall 74 and the guide shell 6. Thus, the ascending air stream that has passed through the blower flow path 330 may flow through the single discharge flow path 40.

The outlet 50 may be a single outlet 50 that communicates with a single discharge flow path 40. Humidified air may be discharged through the single outlet 50.

Figure 6:
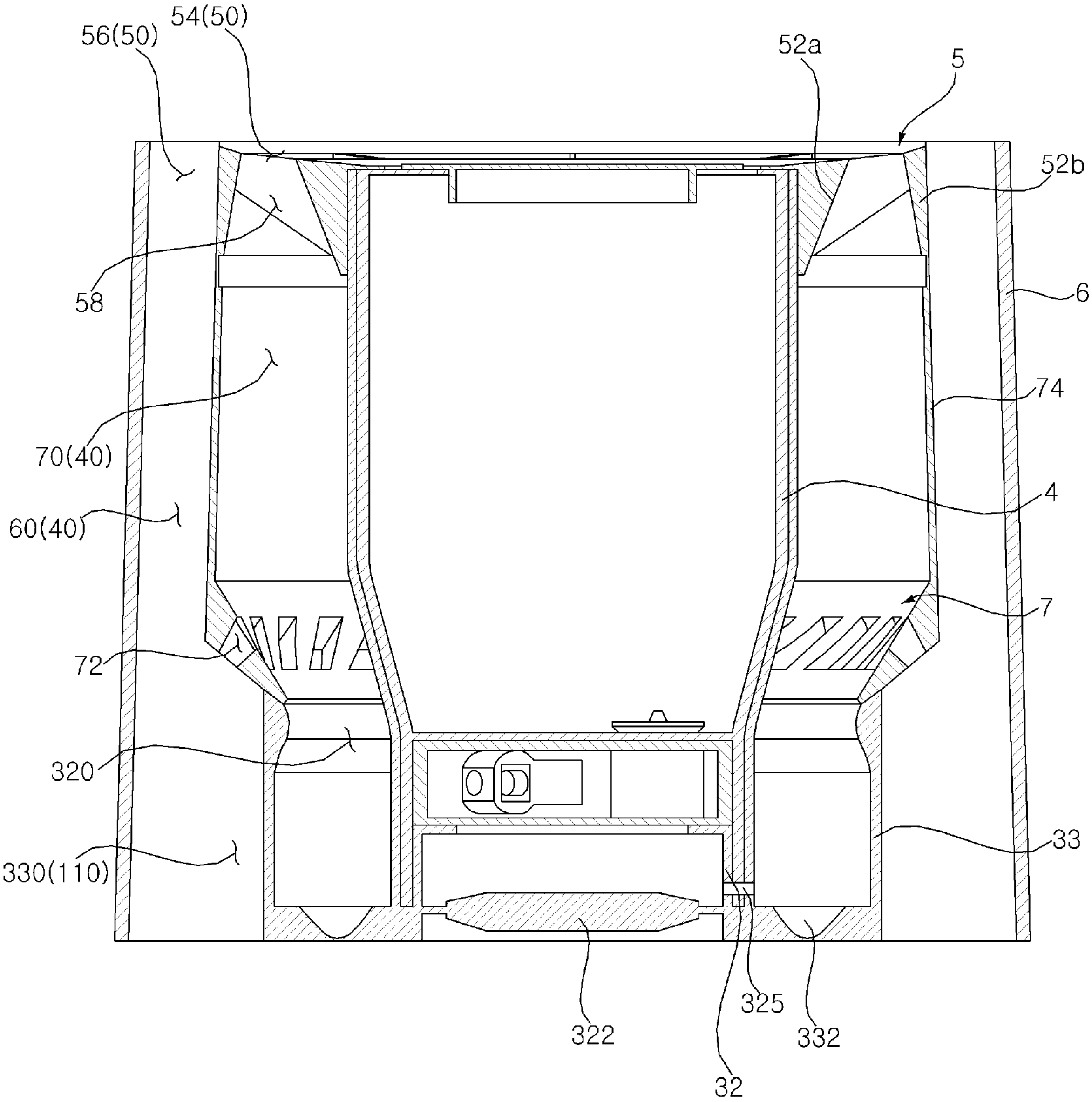
FIG. 6 is a cutaway cross-sectional view of a humidifier according to another embodiment of the present disclosure.
Figure 7:
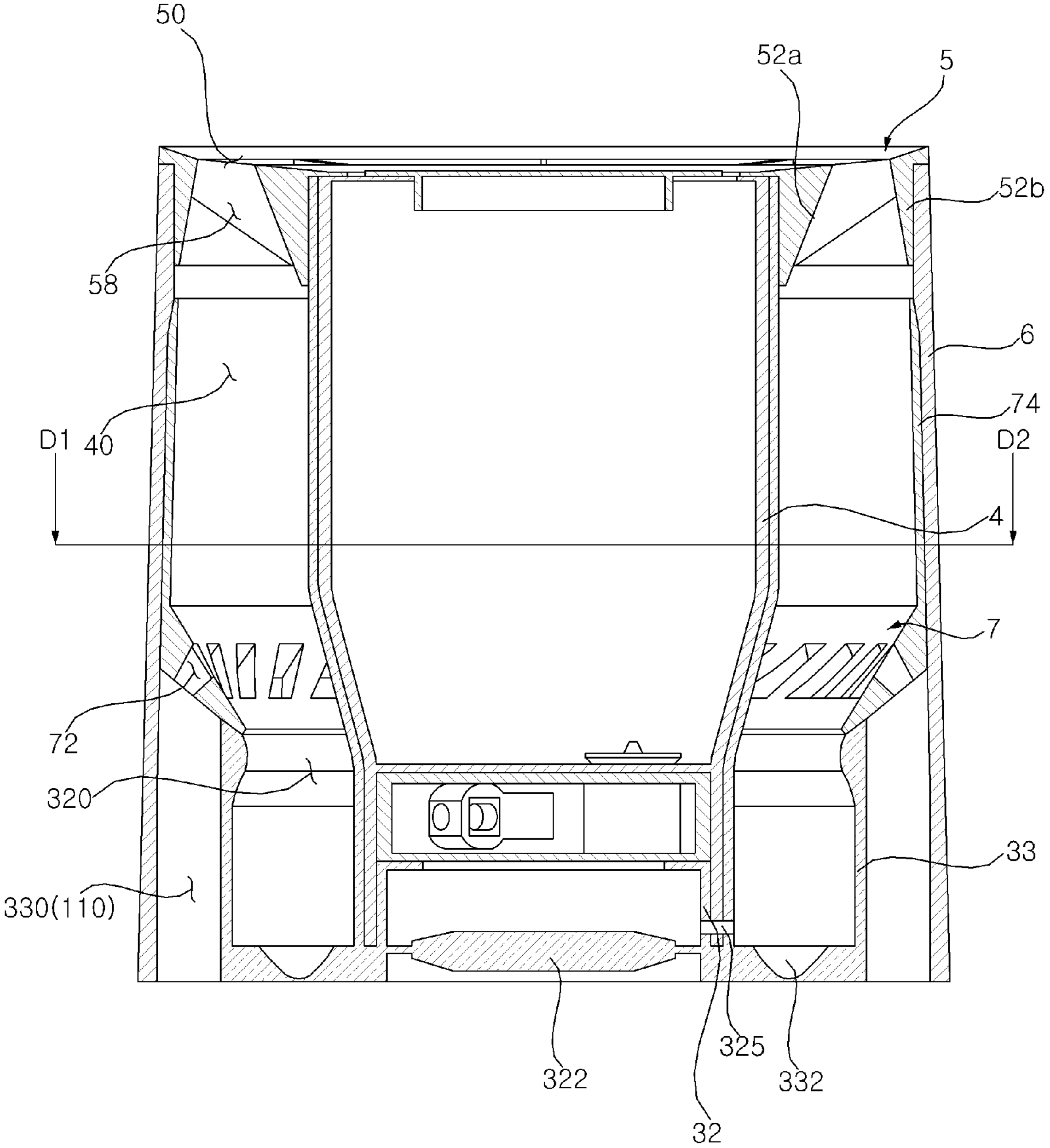
FIG. 7 is a cutaway cross-sectional view of a humidifier according to another embodiment of the present disclosure.

Referring to FIGS. 6 and 7, the humidifier 1 will be described.

The guide opening 72 may be slanted upward toward the inside. The guide opening 72 may be formed obliquely through the diversion guide 7. The guide opening 72 may intersect the direction in which the diversion guide 7 extends. For example, the diversion guide 7 may extend laterally upward, and the guide opening 72 may be formed in such a way as to intersect the direction in which the diversion guide 7 extends. Since the guide opening 72 is formed obliquely toward the outgoing air stream, this may facilitate the formation of an outgoing air stream flowing upward of the humidification reservoir 33.

Therefore, the mist may flow much further upward.

Moreover, the mist may be supplied from the humidifier over a long distance.

In addition, the humidifier may facilitate the supply of mist to the indoor space.

The area of the guide opening 72 may become larger from the upstream of airflow to the downstream thereof. The area of the guide opening 72 may become larger toward the inner discharge flow path 70.

Figure 8:
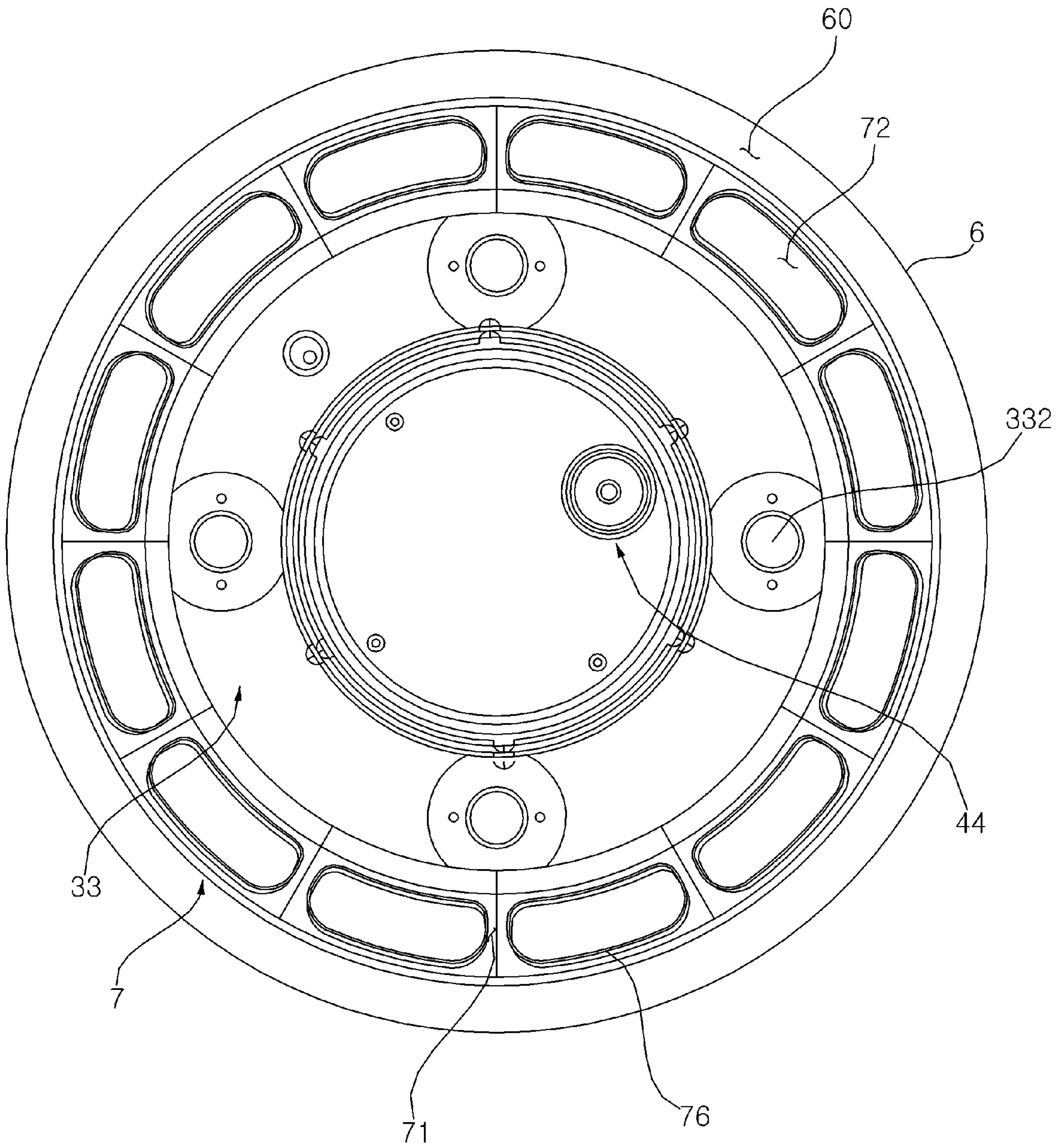
FIG. 8 is a cutaway cross-sectional view taken along the line B1-B2 in FIG. 4.

Referring to FIG. 8, the humidifier 1 will be described.

The tank 4 may be disposed at the center of the case 10. The tank 4 may be spaced inward from the case 10.

The humidification reservoir 33 may be spaced inward from an inner surface of the case 10. The tank 4 may be disposed at the center of the humidification reservoir 33. A plurality of diaphragms 332 may be provided at the bottom of the humidification reservoir 33. The plurality of diaphragms 332 may be spaced out from one another. The plurality of diaphragms 332 may be arranged radially from the center axis of the humidification reservoir 33. The plurality of diaphragms 332 may be located symmetrically. Since the plurality of diaphragms 332 are located symmetrically, mist may be produced uniformly in all directions of the humidification reservoir 33.

Therefore, the humidifier may supply mist uniformly in all directions of the indoor space.

The diversion guide 7 may be disposed around the humidification reservoir 33. An inner peripheral edge of the diversion guide 7 may correspond to an outer peripheral edge of the humidification reservoir 33. The diversion guide 7 may be spaced inward from the case 10. The diversion guide 7 may extend around the periphery of the humidification reservoir 33, and the plurality of guide opening 72 may be disposed in the direction in which the diversion guide 7 extends.

The diversion guide 7 may include a water collection guide 76 protruding from the periphery of the guide opening 72. The water collection guide 76 may include a plurality of water collection guides 76 that are formed along the periphery of the plurality of guide openings 72. The plurality of water collection guides 76 may be spaced apart from each other in a circumferential direction. A water collection flow path 72 where condensate water flows may be formed between the plurality of water collection guides 76 spaced out from one another. The condensate water produced in the discharge flow path 40 may flow along the slant surface of the diversion guide 7, and may pass through the water collection flow path 71 and drip into the humidification reservoir 33. Thus, the humidifier may have better sanitary performance.

Moreover, the durability of the humidifier can be improved.

The guide wall 74 may be spaced outward from the tank 4. The guide wall 74 may be spaced inward from the case 10. The periphery of the guide wall 74 may be positioned outward from the periphery of the humidification reservoir 33. The diversion guide 7 may be disposed between the periphery of the guide wall 74 and the periphery of the humidification reservoir 33. A plurality of guide openings 72 may be disposed between the periphery of the guide wall 74 and the periphery of the humidification reservoir 33.

The inner discharge flow path 70 may be formed between the tank 4 and the guide wall 74. The inner discharge flow path 70 may have an annular cross-section.

The outer discharge flow path 60 may be formed between the guide wall 74 and the guide shell 6. The outer discharge flow path 60 may have an annular cross-section. The outer discharge flow path 60 may have a smaller cross-section than the blower flow path 330.

Figure 9:
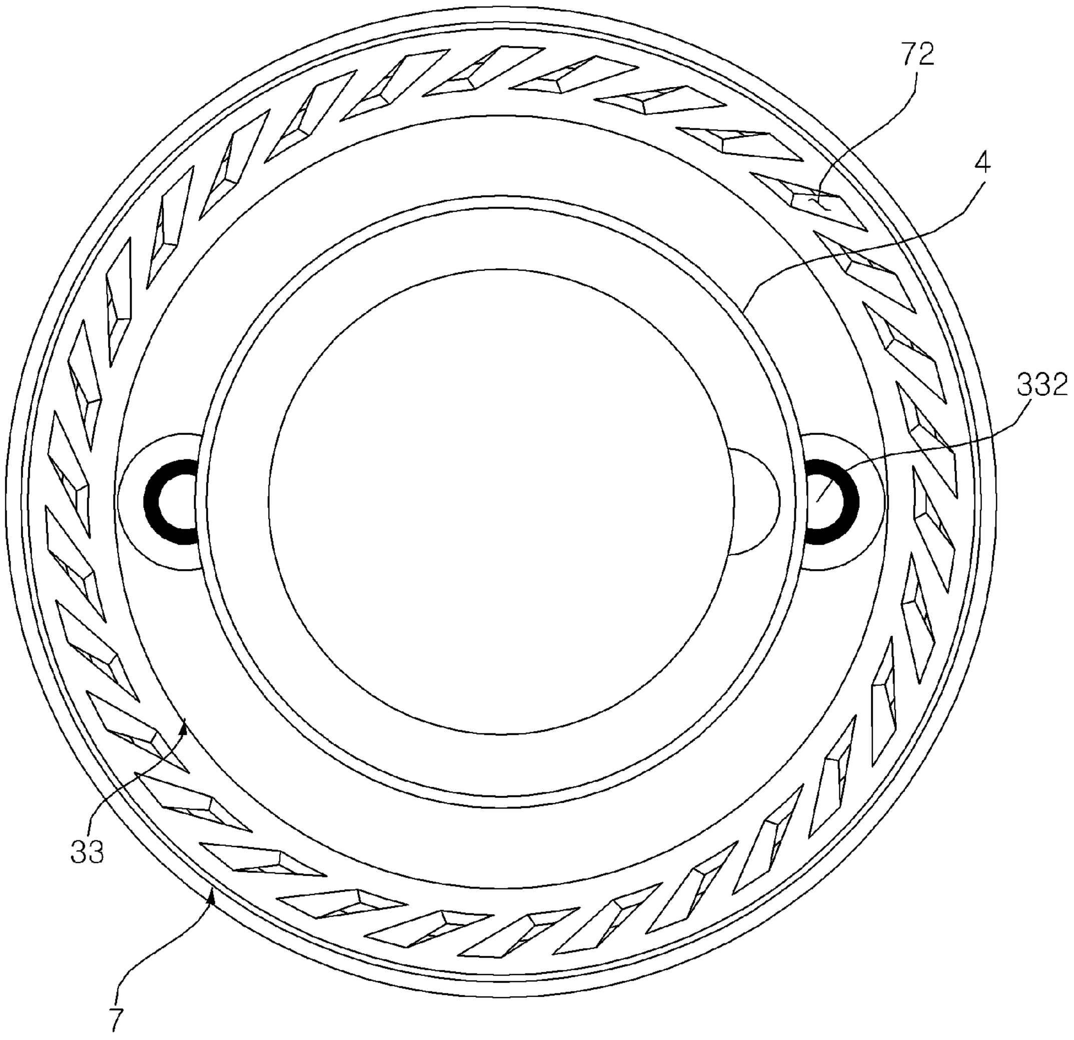
FIG. 9 is a cutaway cross-sectional view taken along the line D1-D2 in FIG. 7.

Referring to FIG. 9, the humidifier 1 will be described.

The diversion guide 7 may extend laterally upward, and the guide openings 72 may extend around the periphery of the humidification reservoir 33 along the direction in which the diversion guide 7 extends. That is, the guide openings 72 may extend in a circumferential direction toward the outside. The plurality of guide openings 72 may be formed in a spiral fashion. The plurality of guide openings 72 may be slanted in one direction when viewed from above. For example, a plurality of guide opening 72 having a parallelogram cross-section may be spaced out from one another, along the periphery of the diversion guide 7.

A swirling component may be imparted to an ascending air stream that has passed through the blower flow path 330 as the ascending air stream passes through the guide openings 72. That is, the ascending air stream may rise as it swirls in spirals while passing through the guide openings 72. Thus, a humidified air stream may be formed which is a uniform mixture of the ascending air stream and the mist.

Moreover, the humidifier may provide humidified air uniformly in all directions.

In addition, the humidifier may provide humidified air over a long distance.

Figure 10:
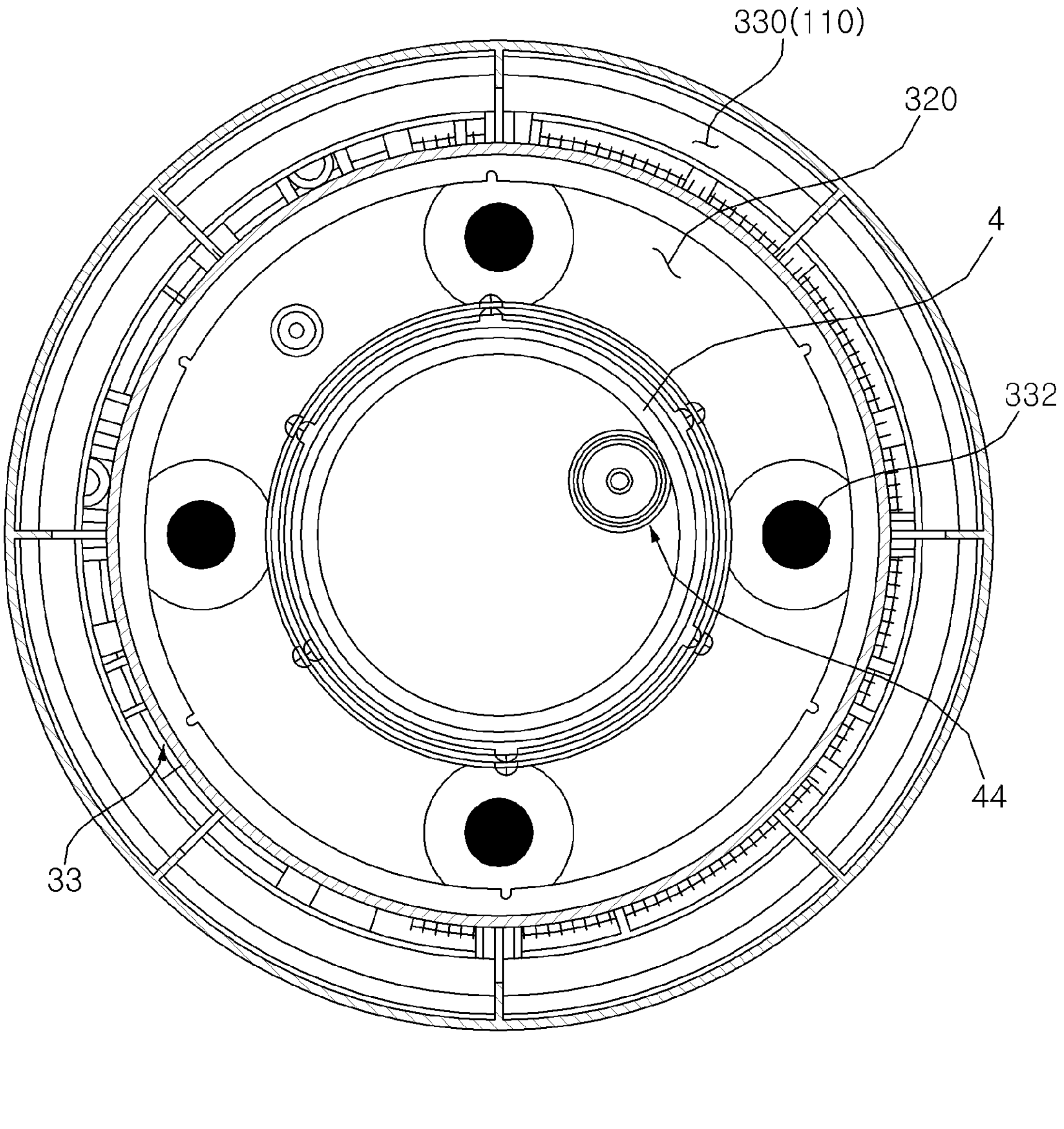
FIG. 10 is a cutaway cross-sectional view taken along the line C1-C2 in FIG. 4.

Referring to FIG. 10, the humidifier 1 will be described.

The blower flow path 330 may be formed between the humidification reservoir 33 and the guide shell 6. The blower flow path 330 may be formed along the inner periphery of the guide shell 6. The blower flow path 330 may be formed along the outer periphery of the humidification reservoir 33. For example, an annular blower flow path 330 may be formed between the guide shell 6 having a circular cross section and the humidification reservoir 33 having a circular cross-section.

The guide shell 6 may be spaced outward from the humidification reservoir 33. The perimeter of the guide shell 6 may be larger than the perimeter of the humidification reservoir 33. The radius of the guide shell 6 having a circular cross-section may be larger than the radius of the humidification reservoir 33 having a circular cross-section.

The tank 4 may be spaced inward from the humidification reservoir 33. The tank 4 may be spaced inward from the guide shell 6. The perimeter of the tank 4 may be smaller than the perimeter of the humidification reservoir 33. The radius of the tank 4 having a circular cross-section may be smaller than the radius of the humidification reservoir 33 having a circular cross-section. An annular mist flow path 320 may be formed between the tank 4 and the humidification reservoir 33.

A plurality of diaphragms 332 may be disposed at the bottom of the humidification reservoir 33. For example, four diaphragms 332 may be disposed at the front, rear, left, and right, respectively, at the bottom of the annular humidification reservoir 33, spaced out from one another.

The mist produced in the humidification reservoir 33 may rise through the mist flow path 320.

The blower flow path 330 may be positioned outward from the mist flow path 320. The blower flow path 330 having an annular cross-section may be positioned outward from the mist flow path 320 having an annular cross-section.

Figure 11:
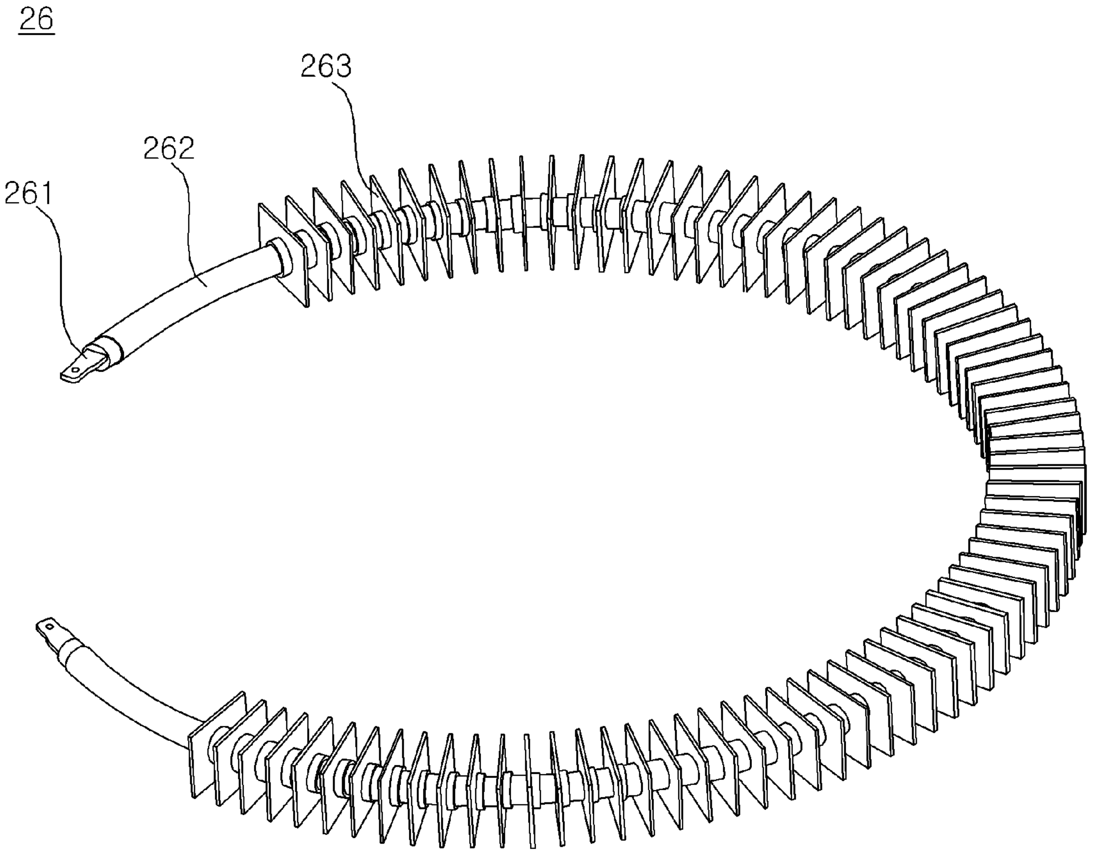
FIG. 11 is a perspective view of a flow path heater according to an embodiment of the present disclosure.

Referring to FIG. 11, the heater 26 will be described.

The flow path heater 26 may heat an ascending air stream formed by the blower fan 24. The flow path heater 26 may be disposed in a flow path where the ascending air stream flows, between the discharge flow path 40 and the blower fan 24. For example, the flow path heater 26 may be disposed in the sub flow path 220 to heat the ascending air stream.

The flow path heater 26 may include a tube 262 from which heat is generated. A heating unit may be disposed within the tube 262. For example, a hot wire may be disposed within the tube 262. The heated tube 262 may heat the ascending air stream.

The tube 262 may extend along the periphery of a cross-section of a flow path where the ascending air stream flows. The tube 262 may be disposed around the periphery of a flow path where the ascending air stream flows. For example, the tube 262 may be disposed along the periphery of the sub flow path 220 where the ascending air stream blown from the blower fan 24 flows.

The tube 262 may have a loop shape. The loop shape may include the shape of a closed loop which is continuous without being broken and the shape of an open loop which is broken at at least one point. For example, the blower flow path 330 may be a flow path whose cross-section is annular, that is formed along the inner periphery of the case, and the tube 262 may have the shape of a loop that is open at one end, that is disposed on a cross-section of the blower flow path 330.

The tube 262 may be disposed on a cross-sectional point of a flow path. The tube 262 may be disposed on the sub flow path 220 or the blower flow path 330.

The tube 262 may be spaced inward from the inner surface of the case 10. For example, the tube 262 may be spaced inward from the blower housing 21, and an ascending air stream may flow between the tube 262 and the blower housing 21. The tube 262 may be spaced outward from the motor cover 22. The ascending air stream may flow between the tube 262 and the motor cover 22.

The flow path heater 26 may include a plurality of fins 263 configured to intersect the tube 262. The plurality of fins 263 may increase the heat-exchange area of the flow path heater 26.

The plurality of fins 263 may be arranged vertically. That is, the plurality of fins 263 may be configured in such a way that a surface where heat exchange with an ascending air stream occurs faces in a lateral direction. This may minimize the plurality of fins 263 from disrupting the flow of the ascending air stream. That is, the ascending air stream may flow to a space between the plurality of fins 263.

The tube 262 may penetrate the plurality of fins 263. Thus, the heat generated from the tube 262 may be transferred to the plurality of fins 263, and the ascending air stream flowing to the space between the plurality of fins 263 may increase in temperature through heat exchange with the plurality of fins 263.

The plurality of fins 263 may be arranged in the direction in which the tube 262 extends. That is, the plurality of fins 263 may be spaced out from one another along the periphery of the tube 262.

The flow path heater 26 may include a terminal 261 for receiving power. The terminal 261 may be formed at one end of the tube 262. For example, the terminal 261 may be formed at one end and the other end of the tube 262 in the direction in which the tube 262 extends. An electric current may be applied through the terminal 261 of the flow path heater 26, and the flow path heater 26 may generate heat.

Referring to FIGS. 1 to 11, a humidifier according to one aspect of the present disclosure may include: a case having an inlet and a outlet with an open top; a humidification reservoir disposed inside the case, that produces mist and has an open top so that the produced mist rises therethrough; a guide wall disposed above the humidification reservoir, that is spaced inward from the case and extends upward; a blower fan disposed below the humidification reservoir, that creates an ascending air stream within the case; and a diversion guide disposed on the top of the humidification reservoir, that divides the ascending air stream, wherein a blower flow path is formed between the humidification reservoir and the case, through which the ascending air stream flows, an inner discharge flow path is formed inside the guide wall, through which the mist produced in the humidification reservoir and part of the ascending air stream that has passed through the blower flow path flow, an outer discharge flow path is formed between the guide wall and the case, through which the rest of the ascending air stream that has passed through the blower flow path flows, and the diversion guide guides part of the ascending air stream that has passed through the blower flow path to the inner discharge flow path.

According to another aspect of the present disclosure, the diversion guide may have a guide opening for allowing the blower flow path and the inner discharge flow path to communicate.

According to another aspect of the present disclosure, the guide opening may be slanted upward toward the inside.

According to another aspect of the present disclosure, the area of the guide opening may become larger toward the inner discharge flow path.

According to another aspect of the present disclosure, the diversion guide may extend laterally upward.

According to another aspect of the present disclosure, the guide opening may extend around the periphery of the humidification reservoir along the direction in which the diversion guide extends.

According to another aspect of the present disclosure, a plurality of openings may be provided, and the plurality of guide openings may be positioned above the blower flow path and disposed around the periphery of the humidification reservoir.

According to another aspect of the present disclosure, the outlet may include an inner outlet communicating with the inner discharge flow path and an outer outlet communicating with the outer discharge flow path, and the case may include a discharge assembly disposed above the humidification reservoir, where the inner outlet and the outer outlet are formed.

According to another aspect of the present disclosure, the humidifier may further comprise a discharge panel disposed between the inner outlet and the outer outlet, by which the inner outlet and the outer outlet are separated.

According to another aspect of the present disclosure, the discharge assembly may include a discharge guide for guiding the mist and ascending air stream flowing through the inner discharge flow path to the inner outlet, wherein the discharge guide forms a tapered flow path whose area becomes smaller toward the top.

According to another aspect of the present disclosure, the inner outlet and the outer outlet may be annular, and the discharge panel may be annular and disposed between the inner outlet and the outer outlet.

According to another aspect of the present disclosure, the case may include a guide shell spaced outward from the humidification reservoir and the guide wall, the blower flow path is formed between the guide shell and the humidification reservoir, and the outer discharge flow path is formed between the guide shell and the guide wall.

According to another aspect of the present disclosure, the humidification reservoir, the guide wall, and the guide shell may be cylindrical, and the blower flow path and the outer discharge flow path may have an annular cross-section.

According to another aspect of the present disclosure, the humidifier may further include a cylindrical tank disposed above the humidification reservoir, spaced inward from the guide wall, wherein the inner discharge flow path is a flow path having an annular cross-section, that is formed between the tank and the guide wall, and the outer discharge flow path is a flow path having an annular cross-section, that is formed between the guide wall and the guide shell.

According to another aspect of the present disclosure, the outlet may include: an annular inner outlet formed between the tank and the guide wall; and an annular outer outlet formed between the guide wall and the guide shell.

According to another aspect of the present disclosure, the humidification reservoir may include a plurality of diaphragms for producing mist, wherein the plurality of diaphragms are arranged radially at the bottom of the humidification reservoir, spaced out from one another.

According to another aspect of the present disclosure, the humidifier may further include a heating reservoir having a reservoir heater for heating water and disposed at the center of the humidification reservoir, wherein the humidification reservoir is spaced inward from the case and surrounds the heating reservoir.

According to another aspect of the present disclosure, the humidifier may further include a tank disposed inside the case, for storing water, wherein the tank is attached to the heating reservoir to supply water to the heating reservoir.

According to another aspect of the present disclosure, the case may include a bypass guide disposed between the blower fan and the humidification reservoir, for guiding the ascending air stream blown from the blower fan to the blower flow path, wherein the bypass guide forms a bypass flow path that has an annular cross-section and extends vertically, wherein the perimeter of an upper end of the bypass flow path is larger than the perimeter of a lower end thereof.

Referring to FIGS. 1 to 11, a humidifier according to one aspect of the present disclosure may include: a case having an inlet and a outlet with an open top; a tank disposed inside the case, for storing water; a humidification reservoir disposed below the tank, that produces mist and has an open top so that the produced mist rises therethrough; and a blower fan disposed below the humidification reservoir, that creates an ascending air stream within the case, wherein the humidification reservoir forms a blower flow path spaced inward from an inner surface of the case, through which the ascending air stream flows, and a discharge flow path is formed between the tank and the inner surface of the case, through which the ascending stream and the mist produced in the humidification reservoir flow.

According to another aspect of the present disclosure, the tank may extend upward and guide the mist produced in the humidification reservoir and the ascending air stream upward, and the outlet communicating with the discharge flow path may be formed between an upper end of the tank and an upper end of the case.

According to another aspect of the present disclosure, the case may include a cylindrical guide shell that forms the blower flow path and the discharge flow path, the tank may be cylindrical and spaced inward from the guide shell, the discharge flow path may be a discharge flow path having an annular cross-section, that is formed between the guide shell and the tank, and the outlet may be an annular outlet that is formed between an upper end of the guide shell and an upper end of the tank.

According to another aspect of the present disclosure, the discharge flow path may communicate with the open top of the humidification reservoir and the blower flow path.

According to another aspect of the present disclosure, the humidifier may further include a diversion guide for guiding at least part of the ascending air stream that has passed through the blower flow path to the discharge flow path.

According to another aspect of the present disclosure, the humidifier may further include a discharge guide disposed on the discharge flow path, wherein the discharge guide forms a tapered flow path whose area becomes smaller toward the top.

According to another aspect of the present disclosure, the humidification reservoir may have an internal space where water is stored and mist flows, and the blower flow path may be formed along the outer periphery of the humidification reservoir and extends upward, wherein the internal space extends upward and communicates with the open top of the humidification reservoir, and the discharge flow path is positioned above the blower flow path and the internal space, and extends upward and communicates with the outlet.

According to another aspect of the present disclosure, the internal space may have a mist flow path which communicates with the open top of the humidification reservoir, and through which the mist produced in the humidification reservoir rises, wherein the blower flow path and the mist flow path are joined together at the discharge flow path.

Referring to FIGS. 1 to 11, a humidifier according to one aspect of the present disclosure may include: a case having an inlet and a outlet with an open top; a tank disposed inside the case, for storing water; a humidification reservoir disposed below the tank, that produces mist and has an open top so that the produced mist rises therethrough; a blower fan disposed below the humidification reservoir, that creates an ascending air stream within the case; and a diversion guide disposed on the top of the humidification reservoir, for diverting the flow of air, wherein a blower flow path is formed between the humidification reservoir and the case, through which the ascending air stream flows, a discharge flow path is formed between the tank and the case, through which the mist produced in the humidification reservoir and the ascending air stream that has passed through the blower flow path flow, and the diversion guide guides the ascending air stream that has passed through the blower flow path to the discharge flow path formed above the humidification reservoir.

Certain embodiments or other embodiments of the disclosure described above are not mutually exclusive or distinct from each other. Any or all elements of the embodiments of the disclosure described above may be combined with another or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

The detailed description thereof should not be construed as restrictive in all aspects but considered as illustrative. The scope of the present disclosure should be determined by reasonable interpretation of the appended claims and all changes that come within the equivalent scope of the invention are included in the scope of the present disclosure.

LIST OF REFERENCE NUMERALS

1: Humidifier
4: Tank
5: Discharge assembly
6: Guide shell
7: Diversion guide
23: Bypass guide
32: Heating reservoir
33: Humidification reservoir
50: Outlet
52: Discharge guide
54: Inner outlet
55: Discharge panel
56: Outer outlet
60: Outer discharge flow path
70: Inner discharge flow path
72: Guide opening
74: Guide wall
330: Blower flow path

What is claimed is:

1. A humidifier comprising:

a case having an inlet and Jalan outlet with an open top;

a humidification reservoir disposed inside the case, configured to produce mist, and having an open top so that the produced mist rises therethrough;

a guide wall disposed above the humidification reservoir, spaced inward from the case, and extending upward;

a blower fan disposed below the humidification reservoir, and configured to create an ascending air stream within the case; and a diversion guide disposed above the humidification reservoir, and dividing the ascending air stream, wherein a blower flow path is defined between the humidification reservoir and the case, through which the ascending air stream flows, wherein an inner discharge flow path is defined inside the guide wall, through which the mist produced from the humidification reservoir and a portion of the ascending air stream that has passed through the blower flow path flow, wherein an outer discharge flow path is defined between the guide wall and the case, through which the rest of the ascending air stream that has passed through the blower flow path flows, and wherein the diversion guide guides part of the ascending air stream that has passed through the blower flow path to the inner discharge flow path.

2. The humidifier of claim 1, wherein the diversion guide has a guide opening communicating the blower flow path and the inner discharge flow path.

3. The humidifier of claim 2, wherein the guide opening is slanted upward toward the inside.

4. The humidifier of claim 3, wherein an area of the guide opening becomes larger toward the inner discharge flow path.

5. The humidifier of claim 2, wherein the diversion guide extends laterally upward.

6. The humidifier of claim 5, wherein the guide opening extends around the periphery of the humidification reservoir along the direction in which the diversion guide extends.

7. The humidifier of claim 2, wherein a plurality of openings are provided, and the plurality of guide openings are positioned above the blower flow path and disposed around the periphery of the humidification reservoir.

8. The humidifier of claim 1, wherein the outlet comprises an inner outlet communicating with the inner discharge flow path and an outer outlet communicating with the outer discharge flow path, and wherein the case comprises a discharge assembly disposed above the humidification reservoir, and having the inner outlet and the outer outlet.

9. The humidifier of claim 8, further comprising a discharge panel disposed between the inner outlet and the outer outlet, by which the inner outlet and the outer outlet are separated.

10. The humidifier of claim 8, wherein the discharge assembly includes a discharge guide guiding the mist and ascending air stream flowing through the inner discharge flow path to the inner outlet, and wherein the discharge guide forms a tapered flow path whose area becomes smaller toward the top.

11. The humidifier of claim 9, wherein the inner outlet and the outer outlet are annular, and the discharge panel is annular and disposed between the inner outlet and the outer outlet.

12. The humidifier of claim 1, wherein the case comprises a guide shell spaced outward from the humidification reservoir and the guide wall, wherein the blower flow path is defined between the guide shell and the humidification reservoir, and wherein the outer discharge flow path is defined between the guide shell and the guide wall.

13. The humidifier of claim 12, wherein the humidification reservoir, the guide wall, and the guide shell are cylindrical, and wherein the blower flow path and the outer discharge flow path have an annular cross-section.

14. The humidifier of claim 13, further comprising a cylindrical tank disposed above the humidification reservoir, and spaced inward from the guide wall, wherein the inner discharge flow path is a flow path having an annular cross-section, and defined between the tank and the guide wall, and wherein the outer discharge flow path is a flow path having an annular cross-section, and defined between the guide wall and the guide shell.

15. The humidifier of claim 14, wherein the outlet comprises:

an annular inner outlet defined between the tank and the guide wall; and an annular outer outlet defined between the guide wall and the guide shell.

16. The humidifier of claim 1, wherein the humidification reservoir comprises a plurality of diaphragms for producing mist, and wherein the plurality of diaphragms are arranged radially at the bottom of the humidification reservoir, and spaced apart from one another.

17. The humidifier of claim 1, further comprising a heating reservoir having a reservoir heater for heating water and disposed at the center of the humidification reservoir, and wherein the humidification reservoir is spaced inward from the case and surrounds the heating reservoir.

18. The humidifier of claim 17, further comprising a tank disposed inside the case, and configured to store water, and wherein the tank is coupled to the heating reservoir and configured to supply water to the heating reservoir.

19. A humidifier comprising:

a case having an inlet and an outlet with an open top;

a tank disposed inside the case, and configured to store water;

a humidification reservoir disposed below the tank, configured to produce mist, and having an open top so that the produced mist rises therethrough;

a blower fan disposed below the humidification reservoir, and configured to create an ascending air stream within the case; and a diversion guide disposed above the humidification reservoir, and diverting the flow of air, wherein a blower flow path is defined between the humidification reservoir and the case, through which the ascending air stream flows, wherein a discharge flow path is defined between the tank and the case, through which the mist produced from the humidification reservoir and the ascending air stream that has passed through the blower flow path flow, and wherein the diversion guide guides the ascending air stream that has passed through the blower flow path to the discharge flow path defined above the humidification reservoir.

* * * * *